US011515704B2

(12) United States Patent
Du et al.

(10) Patent No.: US 11,515,704 B2
(45) Date of Patent: Nov. 29, 2022

(54) USING DISTRIBUTED POWER ELECTRONICS-BASED DEVICES TO IMPROVE THE VOLTAGE AND FREQUENCY STABILITY OF DISTRIBUTION SYSTEMS

(71) Applicant: Battelle Memorial Institute, Richland, WA (US)

(72) Inventors: Wei Du, Richland, WA (US); Kevin P. Schneider, Seattle, WA (US); Francis K. Tuffner, Shoreline, WA (US); Jing Xie, Bellevue, WA (US); Thanh T. Vu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 218 days.

(21) Appl. No.: 17/100,785

(22) Filed: Nov. 20, 2020

(65) Prior Publication Data
US 2021/0210957 A1 Jul. 8, 2021

Related U.S. Application Data

(60) Provisional application No. 62/939,154, filed on Nov. 22, 2019.

(51) Int. Cl.
*H02J 3/00* (2006.01)
*H02J 3/24* (2006.01)
*H02J 3/12* (2006.01)

(52) U.S. Cl.
CPC ............ *H02J 3/00125* (2020.01); *H02J 3/12* (2013.01); *H02J 3/241* (2020.01); *H02J 2203/10* (2020.01); *H02J 2203/20* (2020.01)

(58) Field of Classification Search
None
See application file for complete search history.

(56) References Cited

U.S. PATENT DOCUMENTS 8,183,826 B2   5/2012   Tuffner et al.
8,478,452 B2   7/2013   Pratt et al.
8,700,225 B2   4/2014   Pratt et al.
(Continued)

OTHER PUBLICATIONS

Abb, Volt/VAR Management Software (VVMS) for Smart Grid Distribution Automation Applications, document dated Jan. 2011, 8 pages.

(Continued)

*Primary Examiner* — Jared Fureman
*Assistant Examiner* — Joel Barnett
(74) *Attorney, Agent, or Firm* — Klarquist Sparkman, LLP

(57) ABSTRACT

Methods include, in response to a line frequency variation of a power grid, adjusting a voltage setpoint of a voltage regulator coupled to the power grid at a grid edge to maintain a voltage at the grid edge, wherein the adjusting the regulated voltage setpoint is configured to reduce the line frequency variation to stabilize the line frequency of the power grid. Apparatus include a voltage regulator configured to couple to a power grid at a grid edge and to maintain a voltage at the grid edge, wherein the voltage regulator is further configured to adjust a voltage setpoint of a voltage regulator in response to a line frequency variation of the power grid to reduce the line frequency variation and stabilize the line frequency of the power grid.

33 Claims, 18 Drawing Sheets

(56) References Cited

U.S. PATENT DOCUMENTS

| | | | |
|---|---|---|---|
| 9,441,889 B2 | 9/2016 | Tugurlan et al. | |
| 9,589,297 B2 | 3/2017 | Fuller et al. | |
| 9,753,440 B2 | 9/2017 | Pratt et al. | |
| 9,954,363 B2 | 4/2018 | McCullough et al. | |
| 9,991,711 B2 | 6/2018 | Black et al. | |
| 10,177,697 B2 | 1/2019 | Mukoyama et al. | |
| 2012/0139241 A1 | 6/2012 | Haj-Maharsi et al. | |
| 2014/0320092 A1* | 10/2014 | Radan | B63J 3/02 322/19 |
| 2016/0091539 A1 | 3/2016 | Williams et al. | |
| 2016/0315472 A1 | 10/2016 | McCullough et al. | |
| 2017/0288413 A1 | 10/2017 | Varadarajan et al. | |
| 2018/0131200 A1 | 5/2018 | Crawford et al. | |
| 2019/0020220 A1 | 1/2019 | Lian et al. | |
| 2019/0173285 A1* | 6/2019 | Schneider | H02J 3/241 |
| 2022/0014116 A1* | 1/2022 | Tanaka | H02M 1/42 |

OTHER PUBLICATIONS

Abb, Volt-VAr management solutions for Smart Grid Distribution Automation Applications, document dated Apr. 2013, 12 pages.

Alimisis et al., "Voltage-VAr Optimization (VVO) future trends, challenges and opportunities," in proc. IEEE Power & Energy Society Innovative Smart Grid Technologies Conference, Apr. 2017, 5 pages.

Arnold et al., "Extremum Seeking Control of Smart Inverters for VAR compensation," in proc. IEEE Power and Energy Society General Meeting, Jul. 2015, 5 pages.

Barr et al., "SPIDERS Phase II Technical Report," Burns & McDonnell, [Online] Available: https://www.energy.gov/sites/prod/files/2014/05/f15/spiders_industry_day_technical_report_2014.pdf, May 2014, 36 pages.

Battelle Memorial Institute, gridlab-d / generators / diesel.dg.cpp, document dated Feb. 12, 2012, downloaded from https://github.com/gridlab-d/gridlab-d/blob/feature/730/generators/diesel_dg.cpp on Oct. 23, 2019, 106 pages.

Bollen, "Understanding Power Quality Problems: Voltage Sags and Interruptions," John Wiley & Sons, 5 pages (Oct. 1999).

Braun et al., "Blackouts, Restoration, and Islanding: A System Resilience Perspective," IEEE Power and Energy Magazine, 18(4):54-63 (Jul. 2020).

Cummins Generator Technologies, "AGN 183—Rotor Inertia," Application Guidance Notes: Technical Information from Cummins Generator Technologies, 4 pages (document not dated).

Das and et al., "Renewable Energy Integration in Diesel-Based Microgrids at the Canadian Arctic," Proceedings of the IEEE, 107(9):1838-1856 (Aug. 2019).

De Steese et al., "Conservation Voltage Reduction Potential in the Pacific Northwest," in proc. Energy Conversion Engineering Conference, Aug. 1990, pp. 43-47.

Delille et al., "Experimental validation of a novel approach to stabilize power system frequency by taking advantage of load voltage sensitivity," IEEE Eindhoven PowerTech, pp. 1-6 (Jul. 2015).

Divan et al., "A Distributed Static Series Compensator System for Realizing Active Power Flow Control on Existing Power Lines," IEEE PES Power Systems Conference and Exposition, pp. 654-661 (Oct. 2004).

Du et al., "Modeling of Grid-Forming and Grid-Following Inverters for Dynamic Simulation of Large-Scale Distribution Systems," IEEE Transactions on Power Delivery, 11 pages (Aug. 2020).

Du et al., "Survivability of Autonomous Microgrid During Overload Events," IEEE Transactions on Smart Grid, 10(4):3515-3524 (2019).

"Electric Power Systems and Equipment—Voltage Ratings (60 Hz)," ANSI C84.1-2011, National Electrical Manufacturers Associate, 23 pages (Jan. 17, 2012).

Elkhatib et al., "Evaluation of Inverter-based Grid Frequency Support using Frequency-Watt and Grid-Forming PV Inverters," 2018 IEEE Power & Energy Society General Meeting (PESGM), 5 pages (Aug. 2018).

Erickson et al., "The Effects of Voltage Reduction on Distribution Circuit Loads," IEEE Transactions on Power Apparatus and Systems, PAS-101(7):2014-2018 (Jul. 1982).

Eto et al., "Frequency Control Requirements for Reliable Interconnection Frequency Response," LBNL-2001103, Lawrence Berkley National Laboratory, Feb. 2018, 29 pages.

Eto et al., "Use of Frequency Response Metrics to Assess the Planning and Operating Requirements for Reliable Integration of Variable Renewable Generation," LBNL-4142E, Ernest Orlando Lawrence Berkley National Laboratory, Dec. 2010, 141 pages.

Farhadi-Kangarlu et al., "A comprehensive review of dynamic voltage restorers," International Journal of Electrical Power & Energy Systems, 92:136-155 (Nov. 2017).

Farrokhabadi et al., "Frequency Control in Isolated/Islanded Microgrids Through Voltage Regulation," IEEE Transactions on Smart Grid, vol. 8, No. 3, May 2017, pp. 1185-1194.

Ghosh et al., "Compensation of Distribution System Voltage Using DVR," IEEE Transactions on Power Delivery, 17(4):1030-1036 (Oct. 2002).

Ghosh et al., "Structures and Control of a Dynamic Voltage Regulator (DVR)," 2001 IEEE Power Engineering Society Winter Meeting, 3:1027-1032 (Jan. 2001).

IEEE PES Distribution Systems Analysis Subcommittee Radial Test Feeders, [Online] Available: http://ewh.ieee.org/soc/pes/dsacom/testfeeders/index.html, 2017, 1 page.

"IEEE Standard for Interconnection and Interoperability of Distributed Energy Resources with Associated Electric Power Systems Interfaces," IEEE Std 1547-2018 (Revision of IEEE Std 1547-2003), 138 pages (Apr. 2018).

Johal et al., "Design Considerations for Series-Connected Distributed Facts Converters," IEEE Transactions on Industry Applications, 43(6):1609-1618 (Nov./Dec. 2007).

Jovanovic et al., "Digital System for Power Line Frequency Measurement," Proc. XLVIII ETRAN Conference, vol. I, Jun. 2004, pp. 29-32.

Katiraei et al., "Micro-Grid Autonomous Operation During and Subsequent to Islanding Process," IEEE Transactions on Power Delivery, 20(1):248-257 (Jan. 2005).

Kennedy et al., "Conservation Voltage Reduction (CVR) at Snohomish County PUD," IEEE Transactions on Power Systems, vol. 6, No. 3, Aug. 1991, pp. 986 998.

Kirschner, "Implementation of Conservation Voltage Reduction at Commonwealth Edison," IEEE Transaction on Power Systems, vol. 5, No. 4, Nov. 1990, pp. 1178-1182.

Krishnamurthy et al., "The Operation of Diesel Gensets in a CERTS Microgrid," 2008 IEEE Power and Energy Society General Meeting, 8 pages (Jul. 2008).

Kundur et al., "Definition and Classification of Power System Stability IEEE/CIGRE Joint Task Force on Stability Terms and Definitions," IEEE Transactions on Power Systems, 19(3):1387-1401 (Aug. 2004).

Lasseter et al., "Grid-Forming Inverters: A Critical Asset for the Power Grid," IEEE Journal of Emerging and Selected Topics in Power Electronics, pp. 925-935 (Dec. 2019).

Lasseter, "Smart Distribution: Coupled Microgrids," Proceedings of the IEEE, 99(6):1074-1082 (2011).

Lauria, "Conservation Voltage Reduction (CVR) at Northeast Utilities," IEEE Transactions on Power Delivery, vol. 2, No. 4, Oct. 1987, pp. 1186-1191.

Lesieutre et al., "Phasor Modeling Approach for Single Phase A/C Motors," in proc. IEEE Power and Energy Society General Meeting, Jul. 2008, 7 pages.

Liu et al., "A Carrier Magnitude Varying Modulation for Distributed Static Series Compensator to Achieve a Maximum Reactive Power Generating Capability," IEEE Applied Power Electronics Conference and Exposition (APEC), pp. 1597-1602 (Mar. 2018).

Manbachi et al., "Impact of V2G on Real-time Adaptive Volt/VAr Optimization of Distribution Networks," in proc. IEEE Electrical Power & Energy Conference, Aug. 2013, .6 pages.

Moghassemi et al., "Dynamic Voltage Restorer (DVR): A Comprehensive Review of Topologies, Power Converters, Control Methods, and Modified Configurations," Energies, 13(16):4152 (Aug. 2020).

(56) References Cited

OTHER PUBLICATIONS

Moghe et al., "Turning Distribution Feeders into STATCOMs," IEEE Transactions on Industry Applications, 53(2):1372-1380 (Mar./Apr. 2016).
Hope & Wilson, Industrial Voltage Optimization at Large Industrial Facility Brings Energy Savings, ACEEE Summer Study on Energy Efficiency in Industry, document dated 2011, 12 pages.
Nielsen et al., "Control Strategies for Dynamic Voltage Restorer Compensating Voltage Sags with Phase Jump," IEEE Applied Power Electronics Conference and Exposition, 2:1267-1273 (Mar. 2001).
Pacific Volt Company, "Low Voltage Regulator (LVR)," downloaded from https://www.pacificvolt.com/products, 4 pages (downloaded on Dec. 11, 2020).
Pattabiraman et al., "Comparison of Grid Following and Grid Forming Control for a High Inverter Penetration Power System," 2018 IEEE Power & Energy Society General Meeting (PESGM), pp. 1-5 (Aug. 2018).
Price et al., "Standard Load Models for Power Flow and Dynamic Performance Simulation," IEEE Transactions on power systems, 10(3):1302-1313 (Aug. 1995).
"Recommendations for Updating the Technical Requirements for Inverters in Distributed Energy Resources," Smart Inverter Working Group, document dated Jan. 2014, http://www.energy.ca.gov/electricity_analysis/rule21/documents/recommendations_and_test_plan_documents/Recommendations_for_updating_Technical_Requirements_for_Inverters_in_DER_2014-02-07-CPUC.pdf, 91 pages.
S&C Electric Company, IntelliTeam® VV Volt-VAR Optimization System, Mar. 12, 2016, 2 pages.
Schneider et al., "Analytic Considerations and Design Basis for the IEEE Distribution Test Feeders," In Review IEEE Trans. on Power System, vol. 33, No. 3, May 2018, pp. 3181-3188.
Schneider et al., "Adaptive Dynamic Simulations for Distribution Systems Using Mult-State Load Models," IEEE Trans. on Smart Grid, vol. 10, No. 2, Mar. 2019, pp. 2257-2266.
Schneider et al., "Enabling Resiliency Operations Across Multiple Microgrids With Grid Friendly Appliance Controllers," IEEE Transactions on Smart Grid, vol. 9, No. 5, Sep. 2018, pp. 4755-4764.
Schneider et al., "Evaluating the Feasibility to Use Microgrids as a Resiliency Resource," IEEE Transactions on Smart Grid, vol. 8, No. 2, Mar. 2017, pp. 687-696.
Schneider et al., "Evaluating the Magnitude and Duration of Cold Load Pick-up on Residential Distribution Feeders Using Multi-State Load Models," IEEE Transactions on Power Systems, vol. 31, No. 5, Sep. 2016, pp. 3765-3774.
Schneider, "Evaluation of Conservation Voltage Reduction (CVR) on a National Level," PNNL-19596, Pacific Northwest National Laboratory, Richland, Washington, Jul. 2010, 114 pages.
Schneider et al. "Improving Primary Frequency Response to Support Networked Microgrid Operations," DOI 10.1109/TPWRS.2018.2859742, IEEE Transactions on Power Systems, Jul. 2018, 9 pages.
Schneider et al., "A Method for Evaluating Volt-VAR Optimization Field Demonstrations," IEEE Transactions on Smart Grid, vol. 5, No. 4, Jul. 2014, pp. 1696-1703.
Schneider et al., "Multi-State Load Models for Distribution System Analysis," IEEE Transactions on Power Systems, vol. 26, No. 4, Nov. 2011, pp. 2425-2433.
Shi et al., "A Decentralized Volt/Var Optimization Scheme for Smart Distribution Systems," in proc. IEEE Power & Energy Society Innovative Smart Grid Technologies Conference, Sep. 2016, 5 pages.
Singh et al., "Effects of Distributed Energy Resources on Conservation Voltage Reduction (CVR)," 2011 IEEE Power and Energy Society General Meeting, Jul. 2011, 7 pages.
Ton et al., "A More Resilient Grid: The U.S. Department of Energy Joins with Stakeholders in an R&D Plan," IEEE Power and Energy Magazine, 13(3):26-34 (Apr. 2015).
Tuffner et al., "Grid Friendly Appliance Controllers to Increase the Dynamic Stability of Networked Resiliency-based Microgrids," 2018 IEEE/PES Transmission and Distribution Conference and Exposition (T&D), Apr. 2018, 5 pages.
Tuffner et al., "Modeling Load Dynamics to Support Resiliency-based Operations in Low-Inertia Microgrids," IEEE Transactions on Smart Grid, Mar. 2018, 12 pages.
"Turbine-Governor Models Standard Dynamic Turbine-Governor Systems in NEPLAN Power System Analysis Tool," NEPLAN V555 [Online] Available: http://www.neplan.ch/wp-content/uploads/2015/08/Nep_TURBINES_GOV.pdf, undated, 99 pages.
Van De Vyver et al., "Droop Control as an Alternative Inertial Response Strategy for the Synthetic Inertia on Wind Turbines," IEEE Trans. on Power Systems, vol. 31, No. 2, Mar. 2016, pp. 1129-1138.
Venkataramanan et al., "An AC-AC Power Converter for Custom Power Applications," IEEE Transactions on Power Delivery, 11(3):1666-1671 (Jul. 1996).
Wang et al., "Operation and control of a dynamic voltage restorer using transformer coupled H-bridge converters," IEEE transactions on power electronics, 21(4):1053-1061 (Jul. 2006).
Wilson et al., "Saving Megawatts with Voltage Optimization," in proc, Industrial Technology Conference, Mar. 2010, 10 pages.
Woodward easYgen-3000 Series, [Online] Available: http://www.woodward.com/easYgen3000Series.aspx, 3 pages.
Xu et al., "Microgrids for Service Restoration to Critical Load in a Resilient Distribution System," IEEE Transactions on Smart Grid, vol. 9, No. 1, Jan. 2018, pp. 426-437.
Yuan et al., "Utilizing Distributed Power Flow Controller (dpfc) for Power Oscillation Damping," IEEE Power & Energy Society General Meeting, pp. 1-5 (Jul. 2009).

* cited by examiner

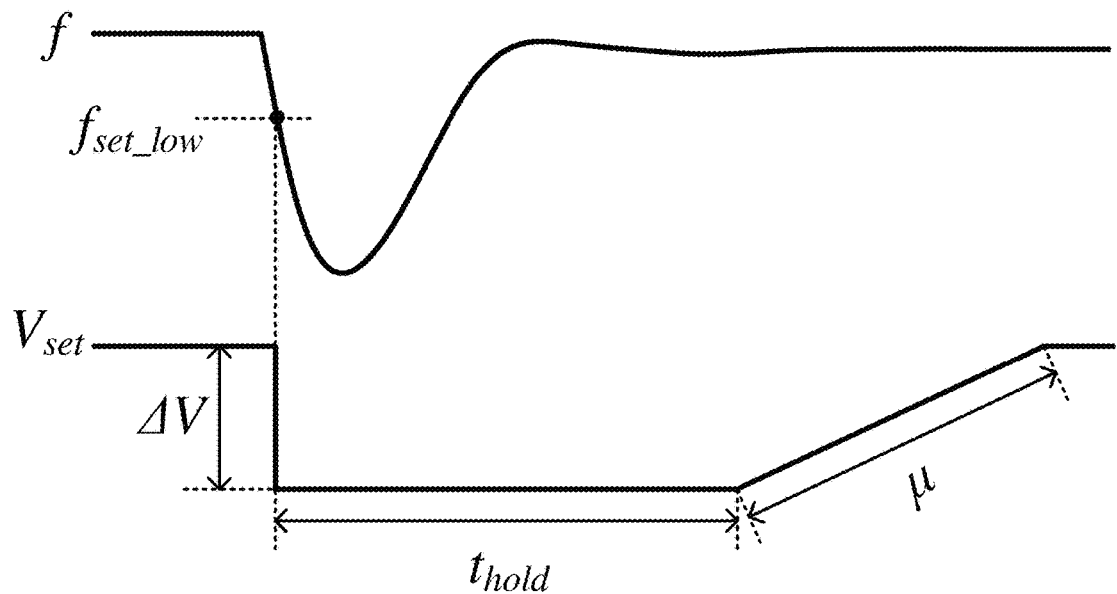
FIG. 9
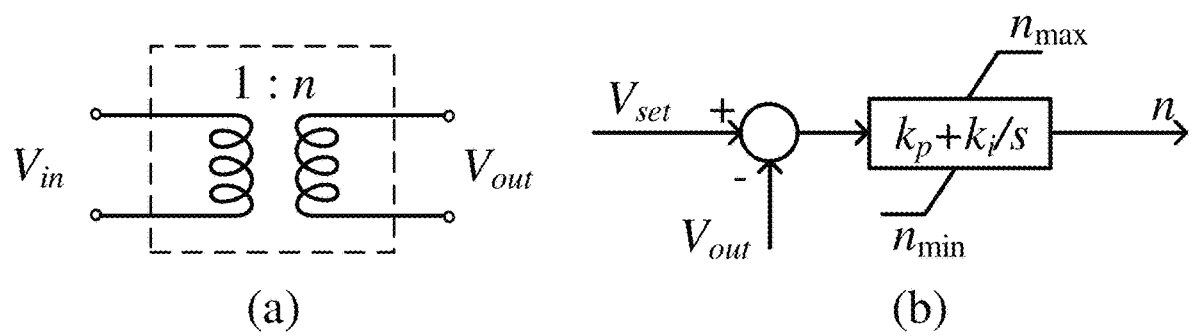
FIG. 11A
FIG. 11B

USING DISTRIBUTED POWER ELECTRONICS-BASED DEVICES TO IMPROVE THE VOLTAGE AND FREQUENCY STABILITY OF DISTRIBUTION SYSTEMS

CROSS REFERENCE TO RELATED APPLICATION

This application claims priority to U.S. Provisional Patent Application No. 62/939,154, filed Nov. 22, 2019, and is incorporated herein by reference.

ACKNOWLEDGMENT OF GOVERNMENT SUPPORT

This invention was made with Government support under Contract DE-AC0576RL01830 awarded by the U.S. Department of Energy. The Government has certain rights in the invention.

FIELD

The field is electrical power distribution systems.

BACKGROUND

Frequency stability is an important requirement for the emerging generation of resilient power distribution systems and networked microgrids. In the past, under-frequency load shedding has been used to regulate the frequency of a power grid during emergency situations. However, these approaches typically require tripping of loads. Thus, a need remains for methods and devices to provide such stability without the attendant drawbacks.

SUMMARY

According to an aspect of the disclosed technology, methods include, in response to a line frequency variation of a power grid, adjusting a voltage setpoint of a voltage regulator coupled to the power grid at a grid edge to maintain a voltage at the grid edge, wherein the adjusting the regulated voltage setpoint is configured to reduce the line frequency variation to stabilize the line frequency of the power grid. Some examples include adjusting a voltage setpoint of one or more other voltage regulators in response to the same line frequency variation to reduce the line frequency variation to stabilize the line frequency of the power grid through the aggregate effect of adjusting the voltage setpoints of the voltage regulators. Some examples include identifying the frequency variation from a line frequency signal. Some examples include detecting the line frequency to produce the line frequency signal. In some examples, the adjusting of the voltage setpoint in response to the line frequency variation includes adjusting the voltage setpoint in response to the line frequency variation passing one or more predetermined line frequency thresholds. In some examples, the adjusting of the voltage setpoint in response to the line frequency variation includes adjusting the voltage setpoint according to a predetermined variation in the voltage setpoint over time. In some examples, the adjusting of the voltage setpoint in response to the line frequency variation comprises controlling to a line frequency setpoint through adjusting of the voltage setpoint as a process variable. Some examples include estimating a grid inertia based on characteristics of the frequency variation and updating based on the estimate a voltage setpoint adjustment to be used in response to a future frequency variation. Some examples include comparing characteristics of the frequency variation to a desired reduction in frequency variation and updating based on the comparison a voltage setpoint adjustment to be used in response to a future frequency variation. In some examples, the voltage regulator includes a series compensator configured to maintain voltage at a secondary side of the voltage regulator. In some examples, the series compensator includes a dynamic voltage restorer. In some examples, the voltage regulator includes a shunt compensator configured to maintain a grid voltage at a primary side of the voltage regulator. In some examples, the adjusting of the voltage setpoint in response to the line frequency variation is performed independent of an external command communication.

According to another aspect of the disclosed technology, apparatus include a voltage regulator configured to couple to a power grid at a grid edge and to maintain a voltage at the grid edge, wherein the voltage regulator is further configured to adjust a voltage setpoint of a voltage regulator in response to a line frequency variation of the power grid to reduce the line frequency variation and stabilize the line frequency of the power grid. Some examples include one or more other voltage regulators configured to adjust respective voltage setpoints in response to the same line frequency variation to reduce the line frequency variation and stabilize the line frequency of the power grid through the aggregate effect of adjusting the voltage setpoints of the voltage regulators. In some examples, voltage regulators can be configured to identify the frequency variation from a line frequency signal. In some examples, voltage regulators can include a line frequency detector configured to detect a frequency of a power grid voltage coupled to the voltage regulator and to produce the line frequency signal corresponding to the detected frequency. Some voltage regulators can be configured to adjust the voltage setpoint in response to the line frequency variation passing one or more predetermined line frequency thresholds. In some examples, voltage regulators can be configured to adjust the voltage setpoint in response to the line frequency variation by adjusting the voltage setpoint according to a predetermined variation in the voltage setpoint over time. In some examples, voltage regulators can be configured to adjust the voltage setpoint in response to the line frequency variation by controlling to a line frequency setpoint through adjustment of the voltage setpoint as a process variable. In some examples, voltage regulators can be configured to estimate a grid inertia based on characteristics of the frequency variation and updating based on the estimate a voltage setpoint adjustment to be used in response to a future frequency variation. Some example voltage regulators can be configured to compare characteristics of the frequency variation to a desired reduction in frequency variation and updating based on the comparison a voltage setpoint adjustment to be used in response to a future frequency variation. Some example voltage regulators can include a series compensator configured to maintain voltage at a secondary side of the voltage regulator. Some series compensators can include a dynamic voltage restorer. Voltage regulators can include shunt compensators configured to maintain a grid voltage at a primary side of the voltage regulator. Some example voltage regulators can be configured to adjust the voltage setpoint in response to the line frequency variation independent of an external command communication. Some example voltage regulator include a controller configured to generate a voltage control signal responsive to a variation in grid voltage and to generate a voltage setpoint adjustment signal in response to the frequency variation. Some example power electronics devices include voltage regulators described herein.

According to a further aspect of the disclosed technology, methods of manufacturing an apparatus can include providing a controller for a voltage regulator at a power grid edge, the controller comprising a computer-readable storage device or memory storing computer executable instructions that when executed by a processor, cause the controller to perform a method of voltage and frequency regulation at the power grid edge, the method comprising: receiving an indication of a line frequency variation in the power grid, and adjusting a voltage setpoint of the voltage regulator to reduce the line frequency variation and stabilize the line frequency of the power grid. Some examples further include programming the controller by selecting one or more frequency variation thresholds for triggering the adjusting of the voltage setpoint. Some examples further include programming the controller to communicate with voltage regulators to coordinate simultaneous frequency regulation with shunt-based compensators. Some examples further include programming the controller to autonomously estimate a grid inertia based on characteristics of the frequency variation and autonomously update based on the estimate a voltage setpoint adjustment to be used in response to a future frequency variation. Some examples further include programming the controller to autonomously compare characteristics of the frequency variation to a desired reduction in frequency variation and autonomously update based on the comparison a voltage setpoint adjustment to be used in response to a future frequency variation.

The foregoing and other objects, features, and advantages of the disclosed technology will become more apparent from the following detailed description, which proceeds with reference to the accompanying figures.

BRIEF DESCRIPTION OF THE DRAWINGS

FIG. 9 is a graph of a frequency variation and a voltage setpoint adjustment made in response to the frequency variation.

FIGS. 11A-11B show a schematic model of a DVR and voltage control of the DVR, respectively.

DETAILED DESCRIPTION

I. Introduction to the Disclosed Technology

Figure 1:
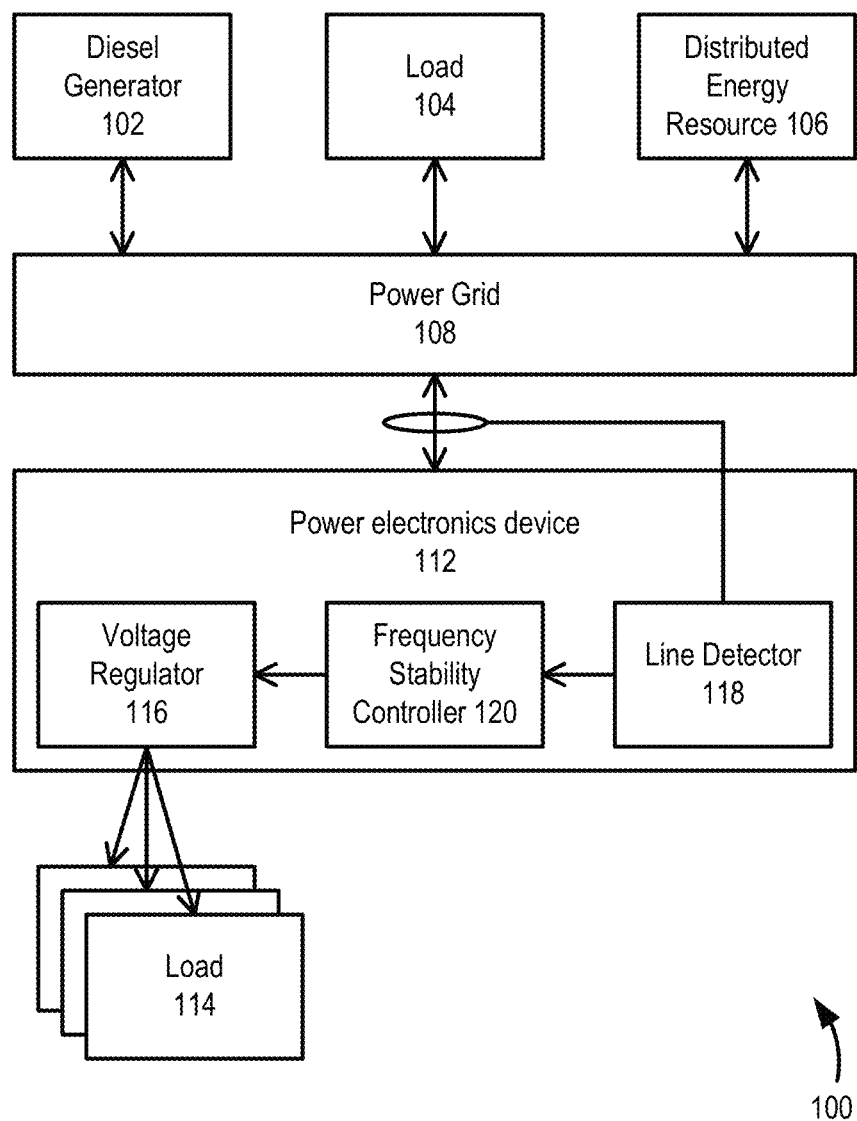
FIG. 1 is a schematic of an electrical power distribution system.

In existing power distribution systems, power-electronics-based devices typically focus on voltage regulation. Examples of distributed power electronics devices can include power-electronics-based series/shunt compensators, as well as various power electronics transformers, such as solid-state transformers. Devices with voltage regulation capabilities can include power grid components at a grid edge. Herein, components at a grid edge generally includes components with voltage regulation components that are distributed within the power grid rather than being located strictly at a primary generation source. For example, power grid components at a grid edge can include devices integrated into the power grid nearer to loads (such as at a local power distribution facility, on a power pole, etc.) as well as devices at or very near loads (such as residential power inverters or consumer charging devices in a residence). In some examples, grid edge components can also include devices that regulate voltage on a main backbone of the power grid or at a power grid substation.

The stability of power systems during transient line frequency variations is an increasingly important factor in preventing power failures and power distribution system component damage during power spikes, particularly in newer grids using smart/resilient power distribution systems, islanded microgrids, or networked microgrids. For example, to improve the resilience against extreme events such as natural disasters and extreme weather, the emerging generation of distribution systems may be configured to allow portions of the feeder to work in islanded mode during power outages as both microgrids and networked microgrids. In particular, the frequency stability of low-inertia islanded power systems can be affected substantially by small changes in the distribution system, such as with networked microgrids operating in an islanded mode. In microgrid architectures, the frequency stability can be critical for operation.

In various disclosed examples, distributed power-electronics-based devices can be used to improve both the voltage and frequency transient stability of electrical power distribution systems and networked microgrids. Selected examples can use advanced communication systems to distribute stability-oriented communications, and some examples can use machine learning technologies to identify grid transient behavior. In some examples, additional control algorithms are leveraged upon existing power-electronics-based devices to improve both the voltage and frequency transient stability of distribution systems. In particular, control methods can supplement existing setpoint-based control strategies and/or machine learning technology can be used to train the set points of distributed controllers. In some examples, the operation of distributed power-electronics based controllers can be fully autonomous. In further examples, controllers can be controlled by advanced communication systems instead of being autonomously controlled, or can be supplemented with control commands from an advanced communication system, to further improve the dynamic performance.

FIG. 1 shows an example power distribution network 100 that includes a plurality of supply and/or demand sources, such as a diesel generator 102, load 104, and/or distributed energy resource 106, coupled to an alternating current power grid 108. One or more power electronics devices 112 are coupled to the power grid 108 to receive electrical power and to transmit power to one or more loads 114. Representative examples of the power electronics device 112 include a voltage regulator 116 configured to maintain an output voltage received by the load 114, even as an input voltage to the power electronics device 112 from the power grid 108 may vary over time. The power electronics device 112 can also include a line frequency detector 118 and a frequency stability controller 120 configured to receive a signal corresponding to the detected line frequency. The frequency stability controller 120 can be coupled to the voltage regulator 116 and configured to change behavior of the voltage regulator 116 based on the detected line frequency, such as by reducing the regulated voltage setpoint, in order to stabilize the line frequency of the power grid 108 such as by reducing the extent of a frequency transient. In representative examples, the controlled change to the voltage setpoint is a temporary adjustment that can be removed after a frequency instability, such as a transient, is sufficiently attenuated.

Figure 2:
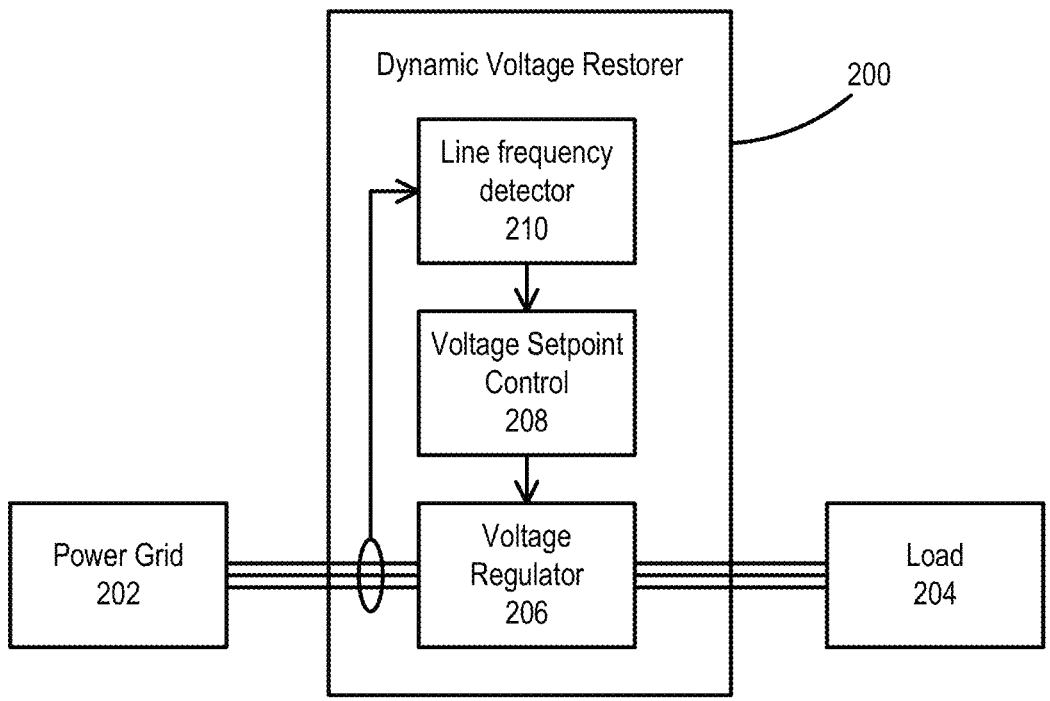
FIG. 2 is a schematic of a frequency stabilization system.

In particular examples, advanced controllers such as the frequency stability controller 120 are configured to adjust the voltage set points of the power-electronics-based devices to improve the frequency transient stability while continuing to provide voltage stability. Two main groups of power-electronics-based devices are used in distribution systems at the grid-level: series compensators such as those made by Pacific Volt, and shunt compensators such as those made by Varentec. In some examples, compensator voltage set points can be adjusted within a specified range during frequency transients to change the power consumption of loads powered through the compensator, thereby reducing or damping transient oscillations and improving stability during the frequency transients while voltage performance is also maintained. For example, series compensators usually have voltage set points are usually fixed at 1 for a secondary (output) side. These voltage set points can be adjusted by the controller to change the power consumption of loads and improve the frequency stability. In addition, the voltage at the primary side of the device is typically left unaffected, avoiding potentially circulating reactive power between the devices. An example dynamic voltage restorer (DVR) 200, such as a series compensator, is shown in FIG. 2. As shown, the DVR is coupled to a power grid 202 to regulate A/C voltage provided to a load 204, such as an industrial building, campus, residence, block of residences, etc. The regulation of voltage is typically provided with a voltage regulator 206 that is coupled to a voltage setpoint control 208 to regulate around a voltage setpoint, such as the fixed setpoint of '1' which can correspond to 120 VAC or other voltages. The DVR 200 can include a line frequency detector 210 configured to detect the frequency of the alternating current of the power grid 202. In some examples, the line frequency detection is external or a separated component from the DVR 200, and in further examples, the line frequency or a setpoint command associated with the line frequency can be communicated to and received by the DVR 200. The voltage setpoints can be adjusted and controlled using various control techniques, such as open-loop feedback, closed-loop feedback, etc. In representative examples, setpoint adjustment triggers based on line frequency thresholds. Machine learning technologies can also be used to recognize transients and/or provide various voltage setpoints or change in setpoints based on the line frequency behavior. In some examples, a communication system issued to dispatch the voltage set points to further improve the dynamic performance. By using a number of power electronics devices that are configured to control an output voltage to also selectively adjust voltage downward in response to line frequency variations, the aggregated effect on the power grid can include a dynamic reduction in power grid line frequency instability, including reduced line frequency overshoots or undershoots relative to desired values.

Existing power-electronics-based devices used in distribution systems are mainly used for voltage regulation, and frequency stability is seldom considered. Disclosed examples use these devices to regulate frequency of the power grid by adding advanced controls on these devices. While under-frequency load shedding has been used to regulate the frequency during emergency situations, some loads require being tripped in the process. Herein, disclosed examples can use power-electronics-based devices to dynamically change power consumption of loads and avoid load shedding.

II. Examples of Improved Frequency Stability of an Islanded Distribution System Using Grid Edge Distributed Compensators As discussed above, DVRs can be deployed in electrical power distribution systems to provide voltage control. DVR can be deployed at various voltage stages of the power grid towards its edges, e.g., at a local substation, power pole, or at individual residences. In disclosed islanded distribution examples, distributed DVRs can be installed at the grid edge to provide fast frequency control by rapidly regulating load voltages within acceptable ranges. Advantageously, distributed DVRs can be conveniently operated in an autonomous mode to improve the frequency stability, e.g., without direct control communications. Frequency control strategies can be implemented in commercially available DVRs, as discussed further hereinbelow. Modeled examples can be used to simulate operation and frequency stability effects in large-scale distribution systems. Simulation of a large-scale, islanded distribution system with multiple distributed DVRs shows that grid edge device examples can be used to effectively maintain voltage quality of multiple critical loads while also improving the frequency stability during large disturbances.

The approach of using an islanded operation of distribution systems can be used to improve the resilience of power grid systems. For example, after a power transmission outage, local distributed energy resources (DERs) can be used to operate the entire distribution feeder, or portions of the feeder, in the form of microgrids and networked microgrids, and such leveraging of DERs can minimize the impact of outages on customers as well as speed up the restoration process. However, such operation raises additional technical challenges, including frequency stability issues that can arise from islanded operation in association with either a low inertia and/or insufficient fast frequency regulation.

Islanded distribution systems are typically supplied by multiple synchronous-generator-based and inverter-based DERs, in contrast to bulk power grids which are mainly supplied by large synchronous generators. For synchronous-generator-based DERs such as natural gas and diesel generators, their inertia time constants are usually between 0.25-1 s, much lower than those of large synchronous generators connected at the transmission level, which are typically between 2-6 s. Because of their significantly smaller size, a loss of generation or load event could cause major frequency transients which can potentially collapse the microgrid system. For inverter-based DERs such as photovoltaic (PV) and type III and type IV wind generators, their inverters mostly use grid-following controls, following the IEEE 1547 standard. A grid-following inverter regulates the active power, P, and reactive power, Q, injected to the grid system, typically though a maximum power point tracking algorithm, and without directly regulating the voltage and frequency. Consequently, such inverters can have a limited impact on frequency stability. In contrast, grid-forming control allows inverters to directly control the voltage and frequency, and grid-forming inverters can improve the frequency stability of islanded distribution systems. However, to take full advantage of grid-forming controls can require a power source connected at the DC side of the grid-forming inverter to balance the variation of loads. Examples of grid-forming inverters include energy storage systems (ESS), microturbines, and others. However, while beneficial, the deployment of MW-level grid-forming ESS remains relatively expensive and challenging. In some applications such as rural areas and remote communities and similar topologies, diesel generators remain the principal power sources because of their low cost.

Thus, for islanded distribution systems where the low-inertia synchronous generators serve as dominant sources, it is desirable to engage more controllable components that might provide frequency regulation. However, DVRs have been deployed in the past only for mitigating power quality issues in distribution systems, such as compensation of voltage sags, harmonics, voltage fluctuations, and reactive power, etc., with DVR examples generally including series devices connected between the distribution grid and load to accomplish the mitigation. Disclosed DVR examples herein including using distributed DVRs installed at the grid edge to improve the frequency stability of islanded distribution systems. In some examples, when a frequency event occurs, the distributed DVRs can selectively change their voltage references, typically within a few cycles, resulting in a change of power consumption of loads, and counteracting the load change of the transient, thereby helping to improve the frequency stability. In series connected DVRs, each DVR can change its voltage reference to a different value during the frequency transient without causing interactions with other voltage regulation devices. This also allows for an absence of direct communications between DVRs in responding to a transient, so that frequency control can be distributed.

The following example frequency control strategy is designed and implemented in a commercially available DVR, with an electromechanical model of the DVR being developed for simulating large-scale distribution systems. Simulation in a large-scale, islanded distribution system with multiple distributed DVRs is also performed, showing that these grid edge devices can not only maintain the voltage quality of multiple critical loads, but also improve the frequency stability during large disturbances.

Figure 3:
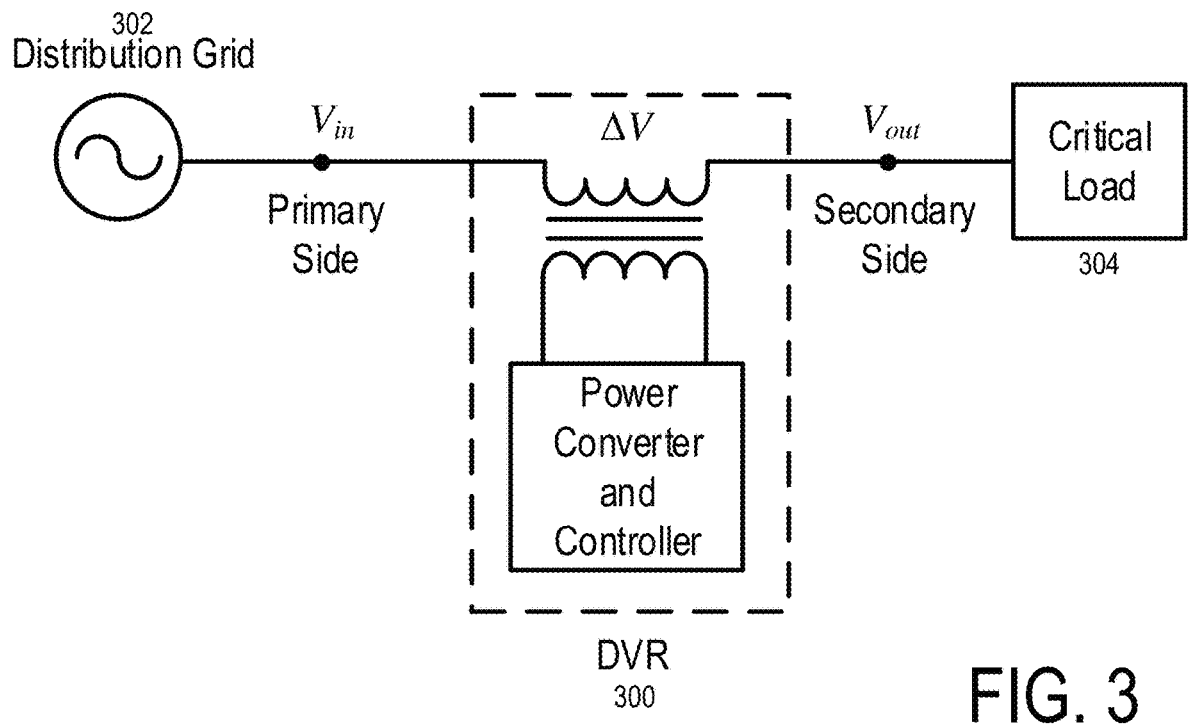
FIG. 3 is a schematic of a dynamic voltage restorer (DVR).

FIG. 3 show an example power-electronics-based series compensator 300, which is a type of DVR that can be connected between a secondary service transformer and a customer meter. When a voltage sag occurs at the upstream on a distribution grid 302 caused by disturbances like faults and starting of large motors, the DVR 300 rapidly injects a voltage ΔV to mitigate the voltage sag, so that a critical load 304 does not feel any disturbances. Thus, the DVR 300 can be considered as a series connected voltage source. In various examples, the DVR 300 can be either supplied by the distribution grid 302 or an independent ESS, and the converter topology can be either DC-AC converter or AC-AC converter. There are typically three types of compensation strategies employed in DVRs for injection of the ΔV: Pre-sag compensation mode, in-phase compensation mode, and energy optimal compensation mode. Disclosed DVR examples can also be used to improve the frequency stability through various rapid response techniques.

Figure 4:
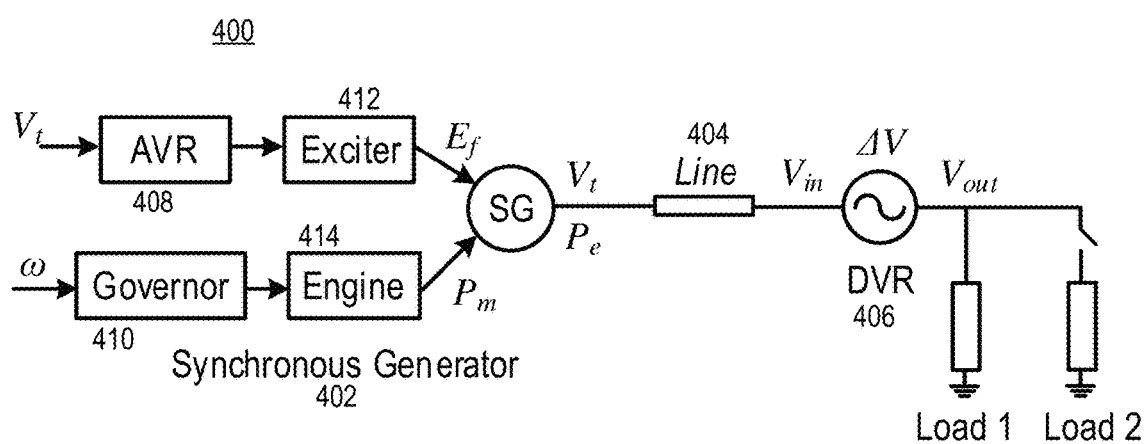
FIG. 4 is a schematic of a synchronous generator-based distributed energy resource (DER) that supplies isolated loads.
Figure 5:
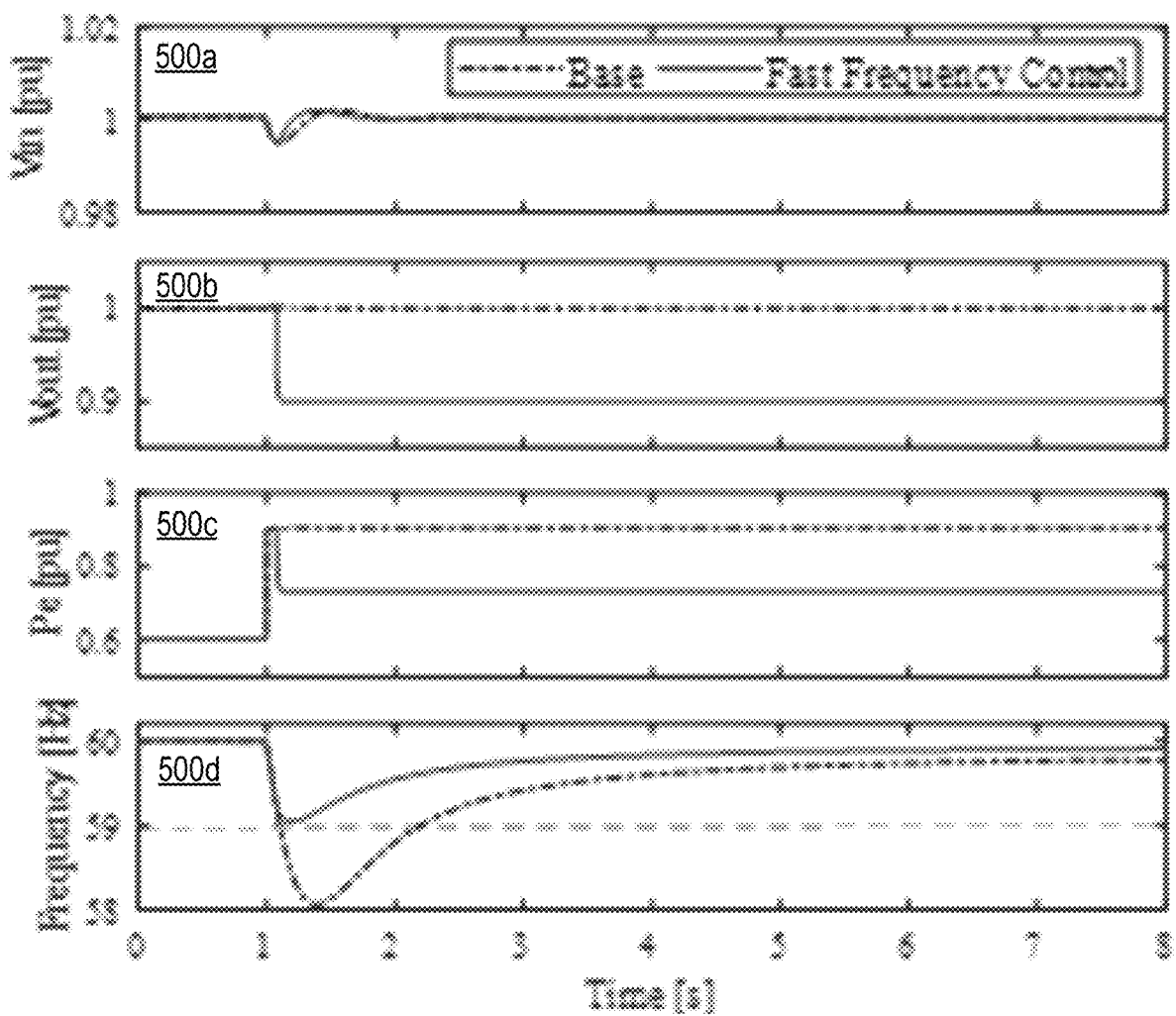
FIG. 5 is a set of four graphs showing the response of a synchronous generator to a load step with and without frequency control.

When working in islanded modes, loads are supplied by DERs instead of the grid. FIG. 4 shows a synchronous-generator-based DER 400 having a synchronous generator 402 supplying resistive Load 1 and Load 2 through a short line 404 and a DVR 406. The voltage and frequency of the generator 402 are controlled by an automatic voltage regulator (AVR) 408 and a governor 410, respectively. The AVR 408 regulates a generator terminal voltage $V_t$ through controlling a field winding voltage $E_f$ from an exciter 412. The governor 410 regulates the speed w through controlling a valve position of an engine 414, which determines the mechanical power $P_m$. FIG. 5 shows four graphs of the response of a synchronous generator to a load step and equation (1) describes the swing equation of a synchronous generator such as the generator 402.

$$2H\frac{d\omega}{dt} = P_m - P_e \quad (1)$$

The speed change is caused by an imbalance between the mechanical power $P_m$ and the electrical power $P_e$ after a disturbance. The frequency response mainly depends on the inertia time constant H and how fast the governor can regulate $P_m$ to match $P_e$. A typical frequency response of a diesel generator to a step change in load is shown as the dash-dotted line in FIG. 5, graph 500d. It can be seen that the frequency drops to 58.07 Hz after Load 2 is switched on, which accounts for 30% load change. In this base case, the DVR is controlled to always maintain its output voltage $V_{out}$ constant.

Compared to $P_m$, $P_e$ is less controllable because it is mostly decided by the variation of loads. However, with a DVR installed in a distribution system, it is possible to adjust $P_e$ through regulating load voltages. The frequency stability could also be improved by regulating $P_e$ according to equation (1). For example, the response time of a DVR is typically within a few cycles at 60 Hz, which is fast enough to impact a frequency event that typically lasts for at least several seconds. The solid lines in the graphs 500a-500d show the response of a generator to the same step change in load, but with a DVR rapidly injecting a ΔV that is 10% of the input voltage $V_{in}$ but in the opposite direction after detecting the frequency dropping below 59.5 Hz. This results in $V_{out}$ dropping from 1 pu to 0.9 pu, as shown by the solid line in graph 500b. Because both Load 1 and Load 2 are resistive loads, the 10% drop of $V_{out}$ causes approximately 0.17 pu reduction of $P_e$, resulting in a frequency nadir being significantly improved from 58.07 Hz to 59.05 Hz, as shown by graphs 500c and 500d. At the same time, $V_{in}$ remains at 1 pu, as shown in graph 500a. Thus, FIG. 5 shows that a DVR can effectively improve the frequency stability of a synchronous-generator-dominated system by rapidly regulating load voltages during disturbances.

The effectiveness of the frequency regulation according to examples of the disclosed technology can rely on the sensitivity of loads to voltage and related load modeling has been an important component of power system modeling. The most common load model is the ZIP load. The active power of the ZIP load P, and the active power to voltage sensitivity $n_p$ are given by equations (2) and (3):

$$P = P_0 \left[ p_z \left( \frac{V}{V_0} \right)^2 + p_I \left( \frac{V}{V_0} \right)^1 + p_P \right] \quad (2)$$

$$n_P \approx \frac{2 \times p_Z + 1 \times p_I + 0 \times p_P}{p_Z + p_I + p_P} \quad (3)$$

where $P_0$ and $V_0$ are the rated active power and nominal voltage, respectively; V is the actual operating voltage; $p_z$, $p_I$, and $p_P$ are the shares of constant impedance, constant current, and constant power load, respectively. When $n_p=2$, all loads are resistive loads. Resistive loads are highly sensitive to voltage, and therefore can provide an effective impact when performing frequency regulation with DVRs. When $n_p=0$, all loads are constant power loads, which cannot be used to provide an effective impact when performing frequency regulation with DVRs. In practice, an accurate value of $n_p$ is difficult to obtain because of the various types of loads coupled to the grid. However, for modeling, $n_p$ is typically between 0.5 and 1.8 and is usually higher than 1.1 for residential loads. Thus, disclosed examples of frequency regulation with DVRs are effective for many islanded power distribution systems and microgrids.

Figure 6:
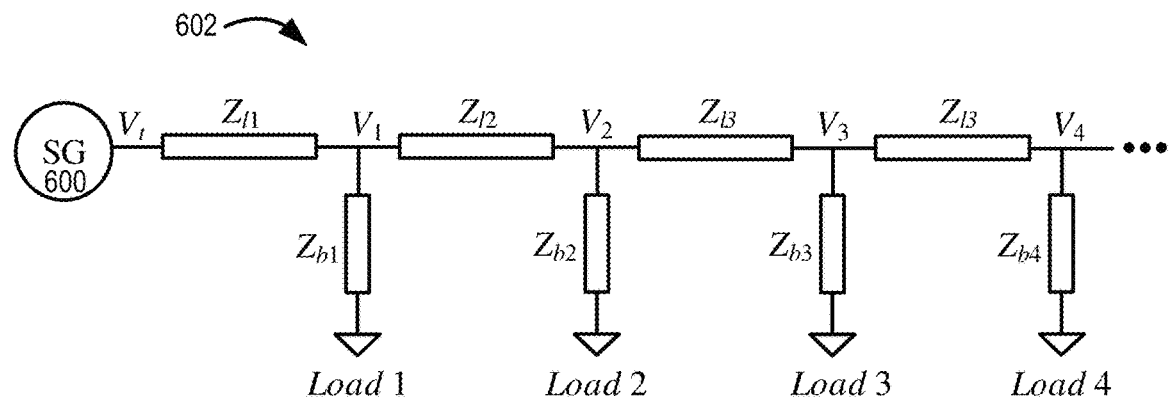
FIG. 6 is a schematic of a grid system supplying powers to loads with a generator.
Figure 7:
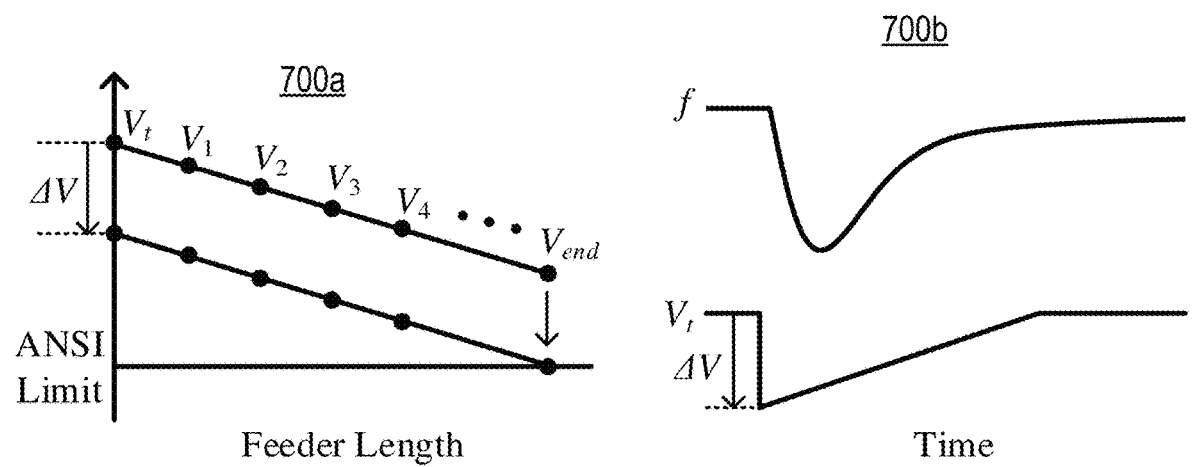
FIG. 7 is a set of two graphs showing restrictions associated with implementation of a centralized, source-oriented frequency regulation approach.

In representative examples, frequency regulation is performed in a distributed manner with multiple DVRs for improving the frequency stability of large-scale, islanded power distribution systems. FIG. 6 shows a synchronous generator 600 supplying a radial distribution feeder 602, where $Z_{li}$ and $Z_{bi}$ (i=1, 2, 3, 4, ...) represent the impedances of each segment and branch, respectively. When an under-frequency event occurs, the frequency drop can be mitigated by quickly reducing the generator terminal voltage $V_t$ by controlling the AVR. Such an approach can be considered as a centralized way of frequency regulating because the entirety of the system voltage is regulated by a single device. (Examples are disclosed in U.S. Pat. No. 10,784,686 and its contents are incorporated by reference herein to the extent not inconsistent with the present disclosure.) The power consumption of all the loads are reduced by reducing $V_t$, and it does not require additional devices for frequency regulation. However, if $V_t$ drops considerably, the drop could potentially result in voltage violations of nodes that are far away from the generator, caused by the voltage drop along the line, especially for very long feeders. Therefore, when designing the frequency controller of the AVR, the allowable voltage drop $\Delta V$ of $V_t$ must be set relatively small to ensure the voltage at the end of the feeder $V_{end}$ does not cause voltage violations, as shown by graph 700a in FIG. 7. Also, reducing $V_t$ could potentially cause interactions with other voltage regulation devices in the system, such as step-voltage regulators and switched shunt capacitors. For example, $V_t$ may require progressively being brought back to its previous value within a certain duration, such as in no more than a few tens of seconds, to avoid the conflict with the step-voltage regulator. It can be seen from graph 700b that $V_t$ brings ramping before the frequency reaches a steady state. Both of these restrictions illustrated with graphs 700a, 700b could potentially limit the effect of some centralized approaches.

Figure 8:
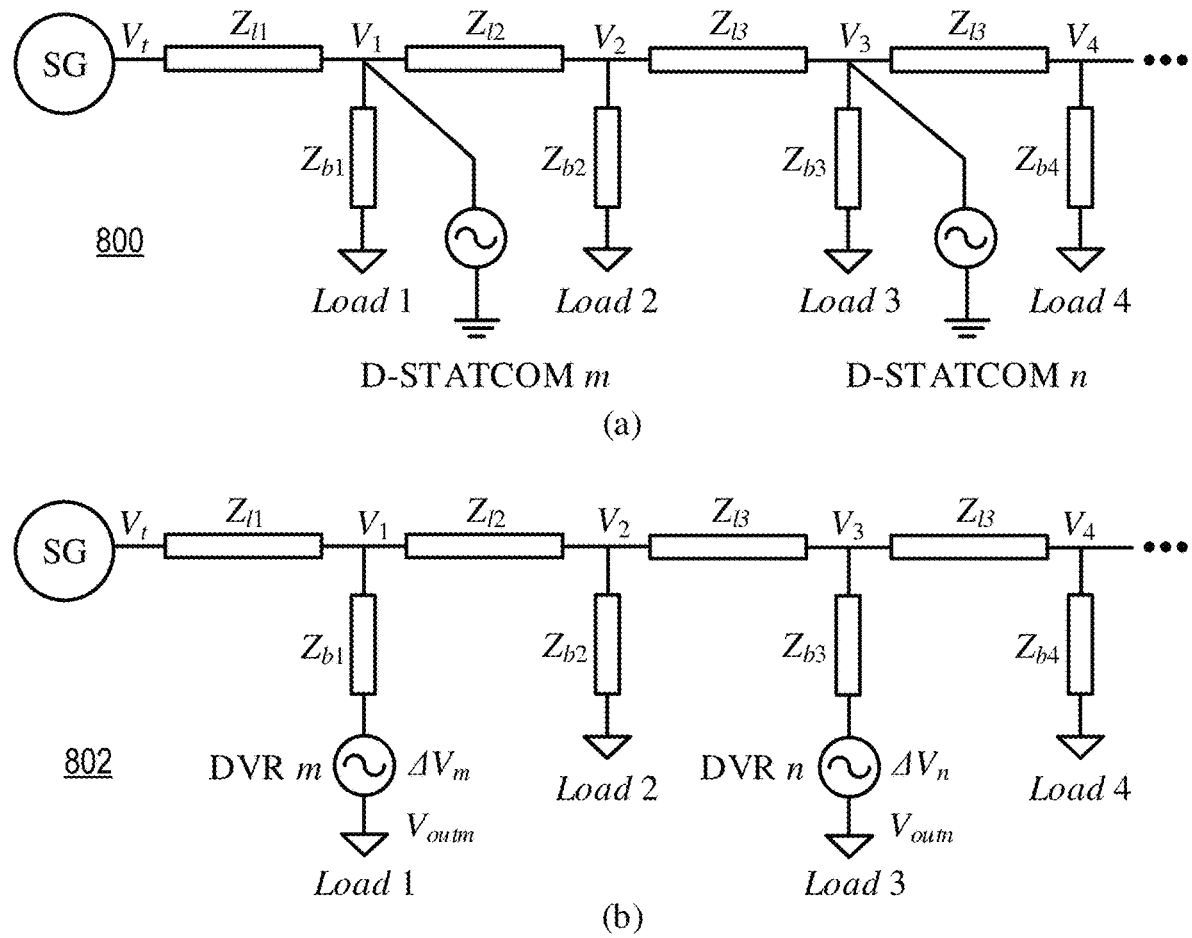
FIG. 8 is a set of two schematics showing distributed series compensation and shunt compensation arrangements.

FIG. 8 shows examples of a shunt compensator based distributed arrangement 800 and a series compensator based distributed arrangement 802, that can be used in islanded distribution systems. These approaches can be used to improve frequency stability with distributed power-electronics-based compensators installed at the grid edge, in contrast to the above described centralized approach. In distribution systems, distribution static synchronous compensators (D-STATCOM) and DVRs are the most representative power-electronics-based devices for shunt and series compensators. Both types of devices have been used to mitigate voltage-related power quality issues and can be understood as voltage regulators. As can be seen in FIG. 8, D-STATCOMs regulate voltages at the primary side, while DVRs regulate voltages at the load side. Distributed D-STATCOMs installed at the secondary side of service transformers can also improve the overall voltage profile of the entire distribution feeder. However, when also used for frequency regulation, the use of distributed DVRs can simplify the frequency controller design and provide more operational flexibilities compared to the use of distributed D-STATCOMs.

Because shunt devices directly regulate voltages at the primary side, during an under-frequency event distributed D-STATCOMs in the arrangement 800 can be configured to reduce their voltage references in the same manner to avoid circulation of reactive power between devices. For the same reason, the synchronous generator also can be coordinated to reduce its voltage reference in the same manner as the D-STATCOMs. To coordinate multiple shunt compensators, controllers can be configured with fast communications to ensure that the D-STATCOMs and synchronous generate coordinate contemporaneous voltage adjustments. In some examples, controllers can be configured to act autonomously, such as with a predetermined set of commands and responses tailored to the grid arrangement to ensure that reactive power circulation does not occur. It will be appreciated that some examples can use only series-type compensators, only shunt-type compensators, or both series and shunt compensators.

DVRs in the arrangement 802 do not have the same restrictions as D-STATCOMs have for frequency regulation. Because DVRs are series devices, each DVR can reduce its load side voltage to a different value during the frequency event. The control will not cause circulating reactive power between devices because voltages at the primary side of the DVRs are minimally affected by the adjusted voltage at the secondary side. For the same reason, interactions between DVRs and other voltage regulation devices, such as synchronous generators and switched shunt capacitors, are avoided. These differences can significantly simplify the frequency controller design for the DVRs in the arrangement 802. Because interactions between devices are avoided, the frequency controllers can be completely distributed (e.g., as part of each DVR) and do not rely on communications. The voltage reference of each DVR can be customized based on the tolerance limit of its own critical load or other factors, and some DVRs need not participate in frequency regulation, thereby significantly increasing the operational flexibility of the distribution system.

In a particular example, frequency regulation control has been implemented in a commercially available DVR, a Low Voltage Regulator (LVR) produced by Pacific Volt. The LVR is typically installed at a secondary side of distribution feeders. The ratings of LVRs are 30-48 kVA for a single-phase device and 125 kVA for a three-phase device. The LVR uses an AC-AC converter topology, eliminating the DC-link capacitors. The LVR uses in-phase compensation strategy, so the phase angle of output voltage always keeps the same with the input voltage, and they can achieve a maximum of 13% boost/buck of the input voltage within one cycle. FIG. 9 is a graph illustrating the frequency control implemented in the LVR. The controller in the LVR quickly reduces the voltage set point $V_{set}$ after detection of an under-frequency event, and then gradually brings $V_{set}$ to nominal value after the frequency reaches a steady state. The controller can also respond to an over-frequency event in a similar manner by increasing $V_{set}$. The control mechanism can be similar to the under-frequency load shedding method used in power systems, but with the load voltage reduced instead of tripping the load.

Example frequency controllers can be designed to only respond to large disturbances that affect stability such as loss of generator events, so the low-frequency set point $f_{set\_low}$ can be set so that it is sufficiently distant from the rated frequency to avoid unwanted responses to small frequency deviations that occur in normal operations. For example, a typical range of $f_{set\_low}$ could be 59.5 Hz to 58.8 Hz, depending on the frequency response of synchronous machines in the system, in a 60 Hz grid. $\Delta V$ can be set as large as possible to improve the effectiveness of the controller, but the value is balanced against voltage regulation standards such as the ANSI C84.1 standard, as well as the tolerant limit of loads. The value $t_{hold}$ can be the length of time $V_{set}$ stays at the lower limit. Unlike the centralized approach at the generator side where $V_{set}$ must be progressively brought back to the nominal value as shown in graph 700b, the distributed DVR approach 802 can allow $V_{set}$ to recover after the frequency reaches the steady state without causing interactions with other voltage regulation devices, therefore increasing the effectiveness of the frequency control. The ramp rate μ can be set relatively small to avoid causing large frequency transients during the voltage recovery process. It will be appreciated that such frequency control can applied to other DVRs as well.

Figure 10A:
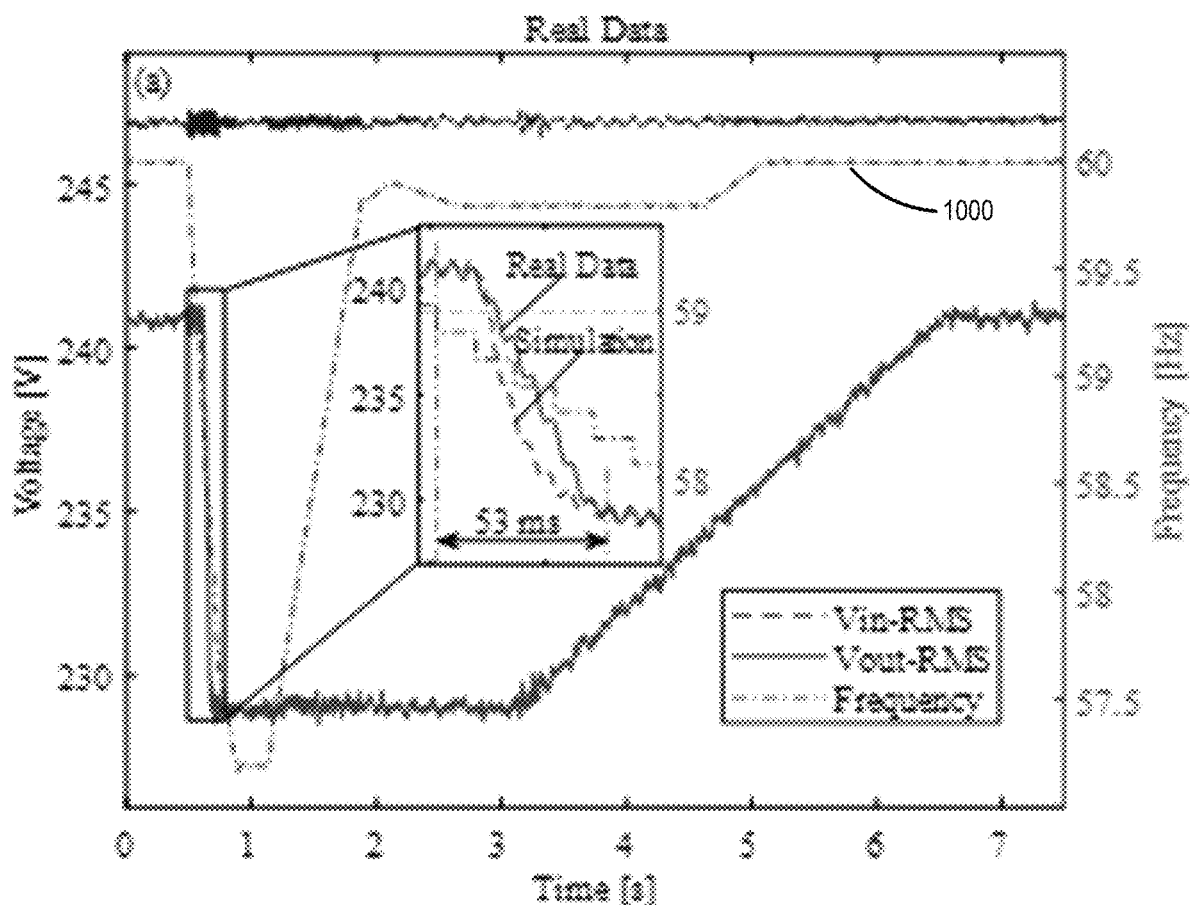
FIGS. 10A-10B are graphs of actual and simulated frequency regulation performance.

FIG. 10A shows the real data of an LVR's response to an under-frequency event. The LVR was fed by a power amplifier with an input voltage $V_{in}$ of 246.5 V, and the output voltage $V_{out}$ was maintained at 241 V. The values for $f_{set\_low}$ and $\Delta V$ were set to 59 Hz and 5% in this test, respectively. The under-frequency event was emulated by changing the frequency of $V_{in}$ as shown by the dash-dotted line 1000, and the voltage magnitude of $V_{in}$ remained constant. After the frequency reached 59 Hz, $V_{out}$ dropped from 241 V to 229 V (a 5% drop) within 53 ms. The experimental result helped to understand the response time of the LVR when responding to a frequency event. In some examples, a distribution grid can include thousands of nodes and a large number of distributed DVRs installed at the grid edge. Electromagnetic models that consider fast switching actions of semiconductors are generally not suitable for performing such simulations because of the low computational efficiency. An electromechanical model of the LVR is depicted in FIG. 11A. Because the LVR uses in-phase compensation, it can be modeled as an ideal series connected transformer with a continuously variable turn ratio n. A simple proportional-integral (PI) controller was developed to adjust n, as shown by FIG. 11B. The constants $k_p$ and $k_i$ are the proportional and integral gains, and $n_{max}$ and $n_{min}$ are the saturation limits. When there is a disturbance in $V_{in}$, the PI controller can quickly bring $V_{out}$ back to $V_{set}$ through regulating n rapidly.

Figure 10B:
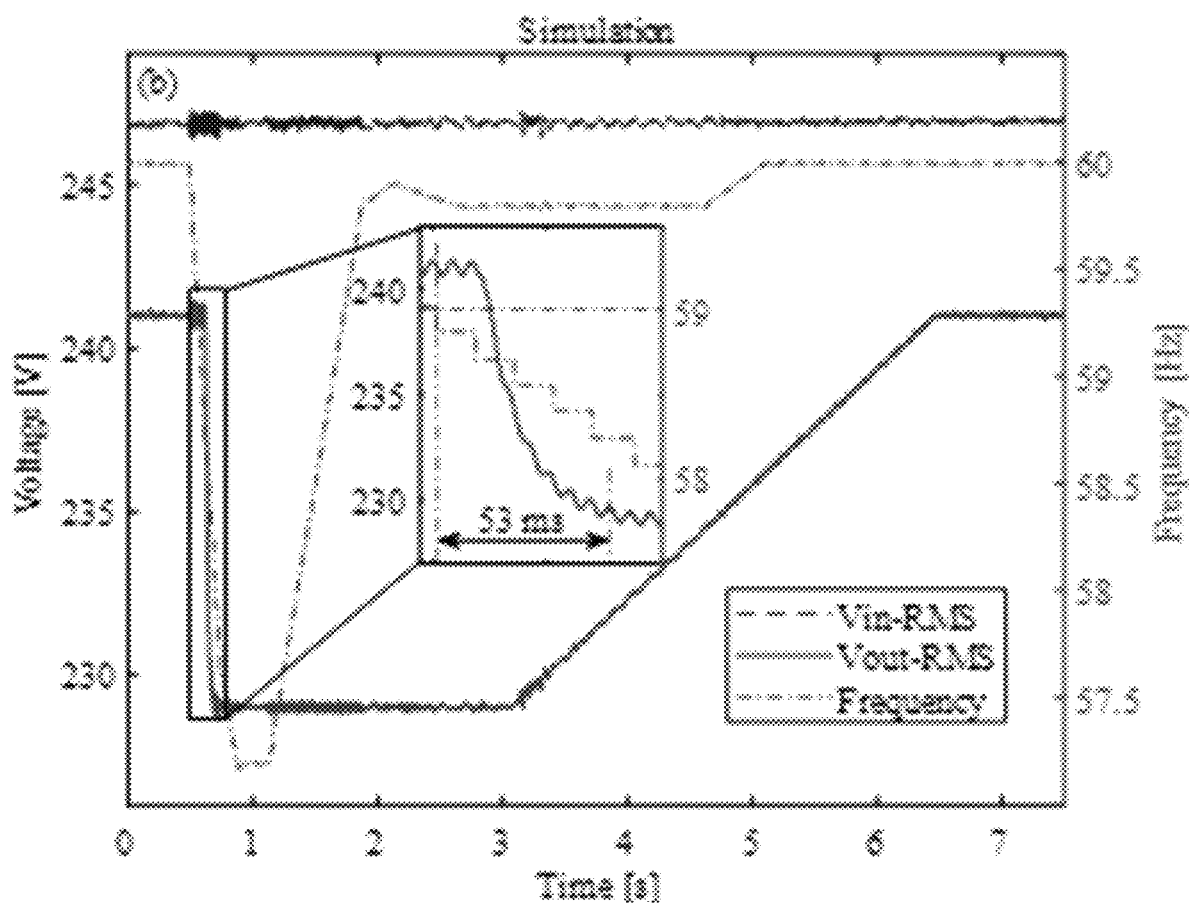

The frequency control strategy shown in FIG. 9 was implemented in the model. To calibrate the model, the same under-frequency event used by the experimental testing was used to test the response of the model. The values of $k_p$ and $k_i$ were tuned to be 0.4 pu and 200 pu/s so that the simulation result can match the experimental result. FIG. 10B shows the simulation result, and the small inset graph in FIG. 10A shows its comparison to the real data and the substantial overlap demonstrating the accuracy of the approach to regulating frequency and improving frequency stability.

Figure 12:
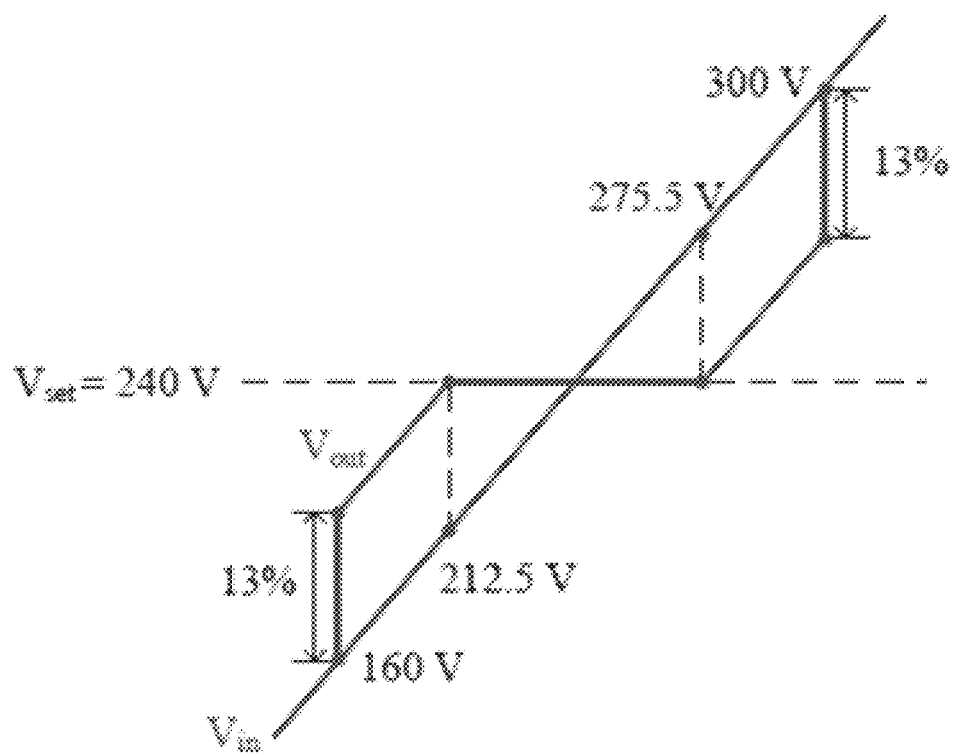
FIG. 12 is a graph of voltage characteristics of a DVR.

III. Examples of Improved Frequency Stability Using Series Compensator Under Alternative Control Scheme As previously discussed, DVRs are generally operated under three different control strategies. An in-phase compensation mode is selected for modeling, though example frequency control strategies also can be applied in pre-sag and energy optimal compensation modes. Because of the voltage limits of devices, DVRs cannot compensate for all ranges of voltage sags. A typical $V_{out}$-$V_{in}$ characteristic is shown in FIG. 12. When a distribution system voltage $V_{in}$ varies between $V_{in\_low}$ and $V_{in\_high}$, the DVR generates a voltage $\Delta V$ to bring the load-side voltage $V_{out}$ back to the setpoint $V_{set}$. When $V_{in}$ falls between $V_{in\_low\_BP}$ and $V_{in\_low\_BP}$ or between $V_{in\_high}$ and $V_{in\_high\_BP}$, the DVR is unable to bring $V_{out}$ back to $V_{set}$, instead compensating for a fixed percentage of $V_{in}$. When $V_{in}$ is below $V_{in\_low\_BP}$ or higher than $V_{in\_high\_BP}$, the DVR can be bypassed and $V_{out}$ is equal to $V_{in}$.

By selecting the in-phase compensation mode, with $V_{out}$ being in phase with $V_{in}$, the DVR can be modeled as an ideal transformer having an adjustable turn ratio adjusted by a controller, as shown in FIGS. 11A-11B. Thus, when a voltage sag occurs at the primary side, the controller quickly regulates the turn ratio n to bring $V_{out}$ back to $V_{set}$ through, e.g., a proportional-integral controller. To ensure that the model agrees with the $V_{out}$–$V_{in}$ characteristic shown in FIG. 12, the controller saturation limits $n_{max}$ and $n_{min}$ can be configured in accordance with equations (4) and (5), which show expressions for $n_{max}$ and $n_{min}$, respectively. For example, when $V_{in}$ varies between $V_{in\_low}$ and $V_{in\_high}$, the controller can select a turn ratio n between $n_{max}$ and $n_{min}$ to bring $V_{out}$ back to $V_{set}$, and when $V_{in}$ falls in between $V_{in\_low\_BP}$ and $V_{in\_low}$ or between $V_{in\_high}$ and $V_{in\_high\_Bp}$, the controller can reach its saturation limit $n_{max}$ or $n_{min}$, so that the device only compensates for a fixed percentage of $V_{in}$. When $V_{in}$ is below $V_{in\_low\_BP}$ or above $V_{in\_high\_BP}$, $n_{max}$ or $n_{min}$ can be switched to 1, representing that the DVR is bypassed.

$$n_{max} = \begin{cases} 1 + \dfrac{V_{set} - V_{in\_low}}{V_{set}}, & V_{in} > V_{in\_low\_BP} \\ 1, & V_{in} \leq V_{in\_low\_BP} \end{cases} \quad (4)$$

-continued $$n_{min} = \begin{cases} 1 - \dfrac{V_{in\_high} - V_{set}}{V_{set}}, & V_{in} < V_{in\_high\_BP} \\ 1, & V_{in} \geq V_{in\_high\_BP} \end{cases} \quad (5)$$

Figure 13A:
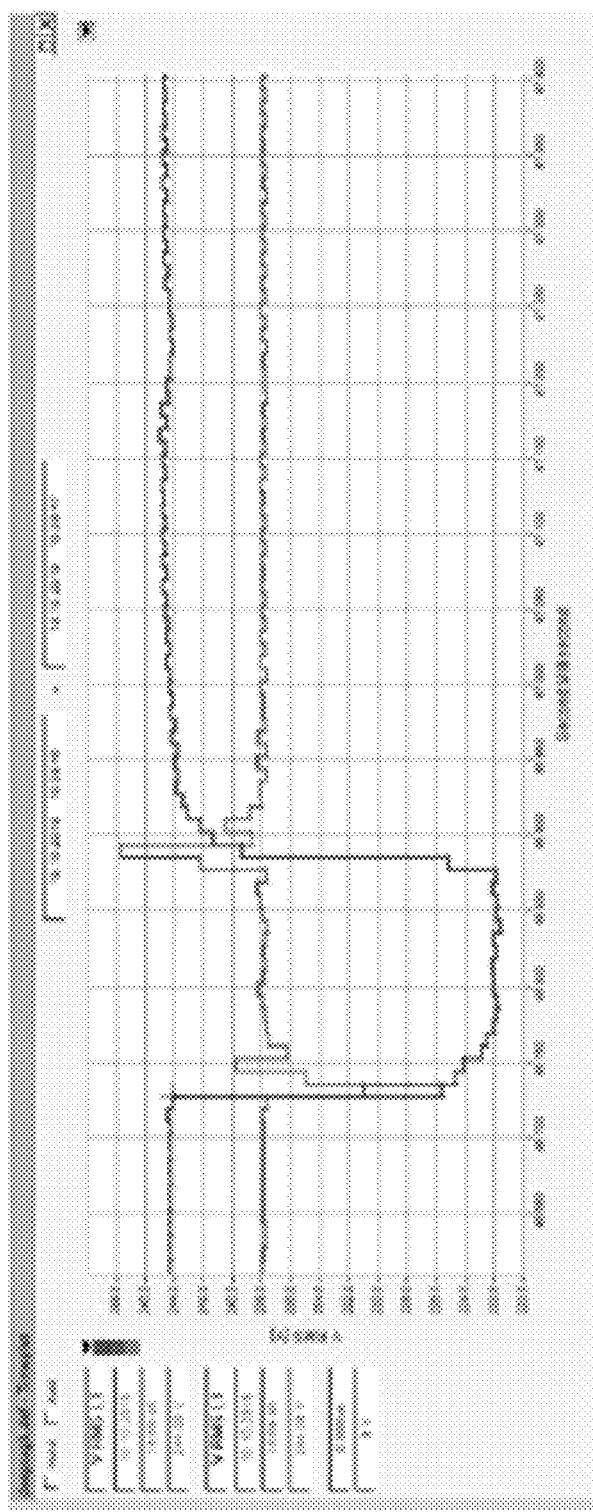
FIG. 13A-13B are graphs of another actual and simulated frequency regulation performance.
Figure 13B:
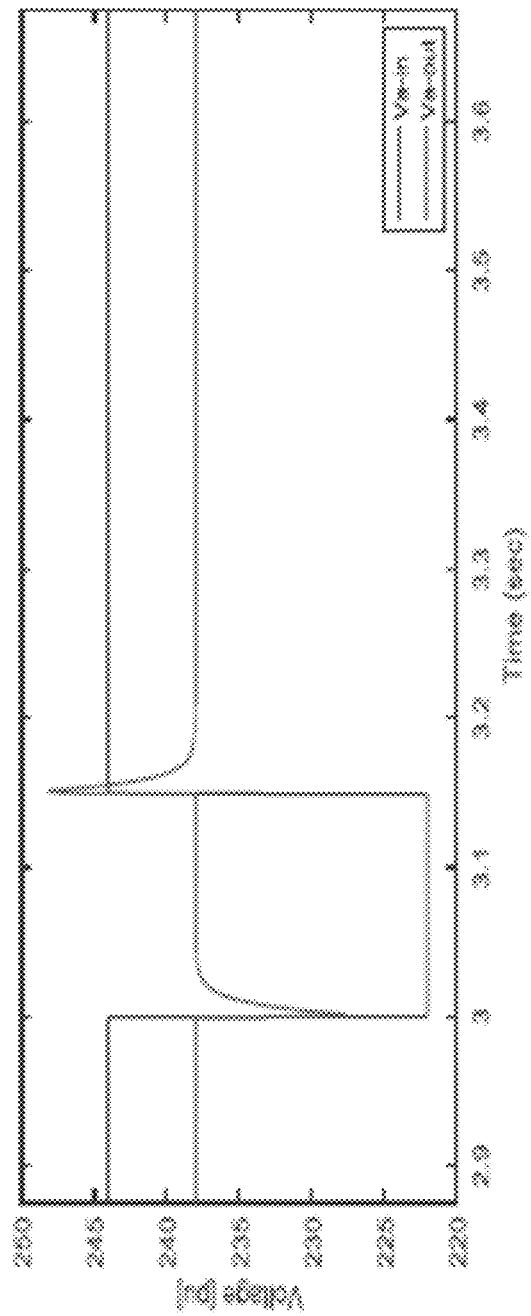

Accuracy of the model was analyzed by simulation and comparison with operation of an LVR type DVR, as discussed previously. As shown in FIG. 13A, during a voltage sag, the DVR can quickly bring a load-side voltage $V_{out}$ back to a rated voltage within approximately 30 ms. Simulation results shown in FIG. 13B agree with the real data, verifying the accuracy of the alternative modeling approach.

Figure 14:
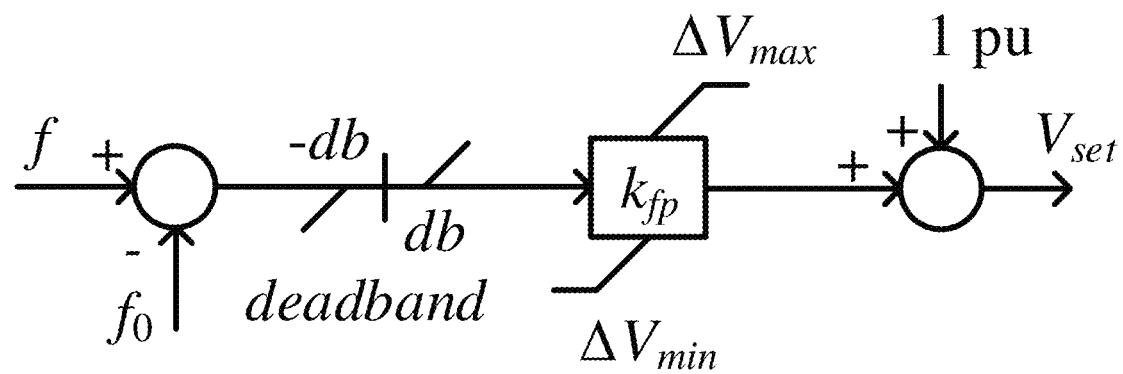
FIG. 14 is a schematic of another voltage control scheme.

FIG. 14 shows another control block example using distributed DVRs to improve the frequency stability of low-inertia networked microgrids by adjusting voltage at a load side of a DVR to effectively change the power consumption of loads. In contrast to the control block described in FIG. 11B, a controller can be configured to receive a measurement of a variation of the line frequency f of the grid and to adjust the voltage setpoint $V_{set}$ accordingly, e.g., with $f_0$ being the rated frequency, $k_{fp}$ as the proportional gain, and $\Delta V_{max}$ and $\Delta V_{min}$ as the saturation limits. Thus, during frequency transients, multiple DVR controllers can quickly adjust the voltage setpoints of loads to mitigate power unbalance between generating units and loads, therefore improving the frequency stability. Again, voltages at a primary side of the DVRs are minimally affected by the controllers, so circulating reactive power between devices is avoided. Also, while communication between DVRs or with a central controller is possible, it is not required in all examples as the controller can be configured to rely on local information for executing control actions.

In some examples, the saturation limits $\Delta_{Vmax}$ and $\Delta_{Vmin}$ can be determine the effectiveness of the controller, as the selection of the limits can involve a trade-off between frequency regulation capability and the quality of load voltages. For example, a larger value of $\Delta V_{max}$ and $\Delta V_{min}$ can result in an improved frequency regulation capability but also reduce voltage quality for the loads. In a particular example, the $\Delta V_{max}$ and $\Delta V_{min}$ limits can be selected based on the ANSI C84.1 standard which specifies two steady-state voltage ranges, A and B, such that when range A is selected, the load voltage can vary between 0.95 pu and 1.05 pu, and when range B is selected, the load voltage can vary between 0.917 pu and 1.058 pu. Table I below lists the values of $\Delta V_{max}$ and $\Delta V_{min}$ based on the two ranges. While the specification describes steady-state voltages, the ranges can also be used to delimit transient voltages to guarantee high-quality load voltages.

TABLE I

Parameters of $\Delta V_{max}$ and $\Delta V_{min}$

| Range A | | Range B | |
|---|---|---|---|
| $\Delta V_{max}$ = 0.05 pu | $\Delta V_{min}$ = 0.05 pu | $\Delta V_{max}$ = 0.058 pu | $\Delta V_{min}$ = 0.083 pu |

Figure 15:
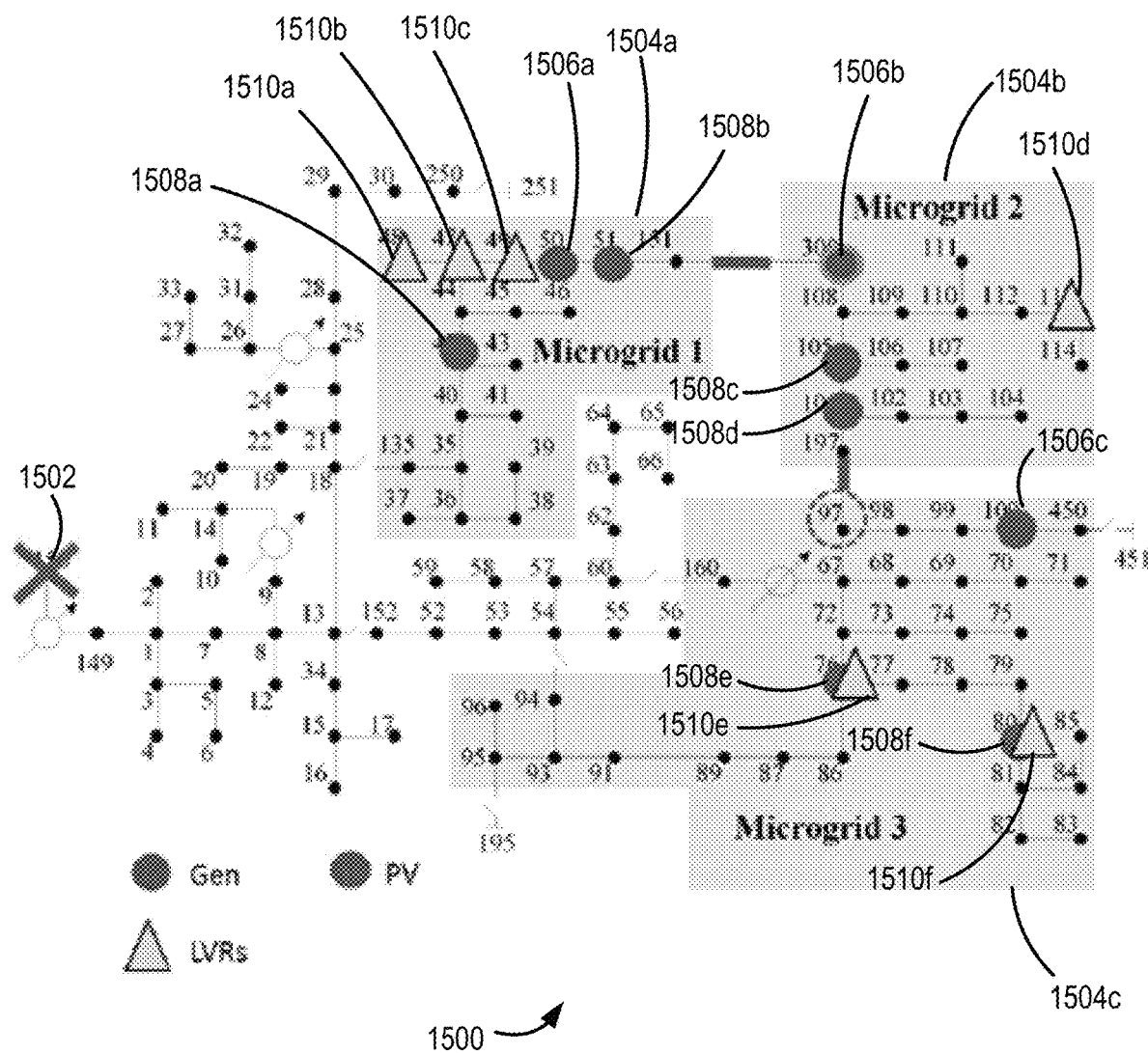
FIG. 15 is a schematic of a grid simulation with distributed frequency regulation.

The effectiveness of the frequency control strategy of distributed DVRs was evaluated through simulation in a modified IEEE 123-node test feeder 1500 shown in FIG. 15. During the simulation, a substation voltage source 1502 is lost because of an extreme weather event, and three microgrids 1504a-1504c are interconnected as a networked microgrid. In the islanded networked microgrid, there are three 600 kW synchronous generators 1506a-1506c and six utility-scale photovoltaic (PV) grid-following inverters 1508a-1508f. The locations and ratings of synchronous generators 1506a-1506c and PV inverters 1508a-1508f are listed in Table II below. The total rating of the PV inverters 1508a-1508f is about 1400 kW, and the peak total load in the networked microgrid is about 2060 kW. The PV penetration level is around 67.9%. Together, these features show that this is a highly inverter-penetrated, low-inertia networked microgrid.

Six distributed DVRs 1510a-1510f are arranged to cover 36% of the total loads. The loads installed with the DVRs 1510a-1510f can be assumed to be critical loads. For example, DVRs are typically used to compensate for voltage sags when the system is operating in grid-connected mode. In the simulation, the frequency stability control capability described above was used to improve the frequency stability of the system operating in an islanded mode. The locations of the DVRs are listed in Table III, and the controller parameters of DVRs are listed in Table IV. The simulations were conducted in GridLAB-D, which is an open-source distribution system analysis software developed by the U.S. Department of Energy at Pacific Northwest National Laboratory. A generator trip event of generator 1506b is simulated to cause a major frequency disturbance across the grid of the feeder 1500, for which three different scenarios are evaluated: in Scenario 1, the frequency control is disabled, and the DVR devices 1510a-1510f control their load voltages at a rated value; in Scenario 2, the frequency control by the DVR devices 1510a-1510f is enabled, and the load voltages can vary in Range A; and in Scenario 3, the frequency control is also enabled, and the load voltages can vary in Range B.

TABLE II

Locations and Ratings of Generators and Inverters

| Generator/Inverter (#) | Microgrid (#) | Node (#) | Rating (kW) |
|---|---|---|---|
| Generator 1 | 1 | 50 | 600 |
| Generator 2 | 2 | 300 | 600 |
| Generator 3 | 3 | 100 | 600 |
| Inverter 1 | 1 | 44 | 200 |
| Inverter 2 | 1 | 51 | 300 |
| Inverter 3 | 2 | 105 | 200 |
| Inverter 4 | 2 | 101 | 300 |
| Inverter 5 | 3 | 72 | 200 |
| Inverter 6 | 3 | 82 | 200 |

TABLE III

Locations of Distributed DVRs

| DVR (#) | Microgrid (#) | Node (#) | Load Type |
|---|---|---|---|
| 1 | 1 | 48 | Constant Impedance |
| 2 | 1 | 47 | Constant Current |
| 3 | 1 | 49 | Constant Impedance |
| 4 | 2 | 113 | Constant Impedance |
| 5 | 3 | 76 | Constant Current |
| 6 | 3 | 80 | Constant Impedance |

TABLE IV

Controller Parameters of the DVR

| $k_p$ [pu] | $k_i$ [pu/s] | $k_{fp}$ [pu] | deadband [Hz] |
|---|---|---|---|
| 0.4 | 200 | 2 | ±0.05 |

| $V_{in\_high}$ [pu] | $V_{in\_high\_BP}$ [pu] | $V_{in\_low}$ [pu] | $V_{in\_low\_BP}$ [pu] |
|---|---|---|---|
| 1.15 | 1.25 | 0.85 | 0.67 |

Figure 16A:
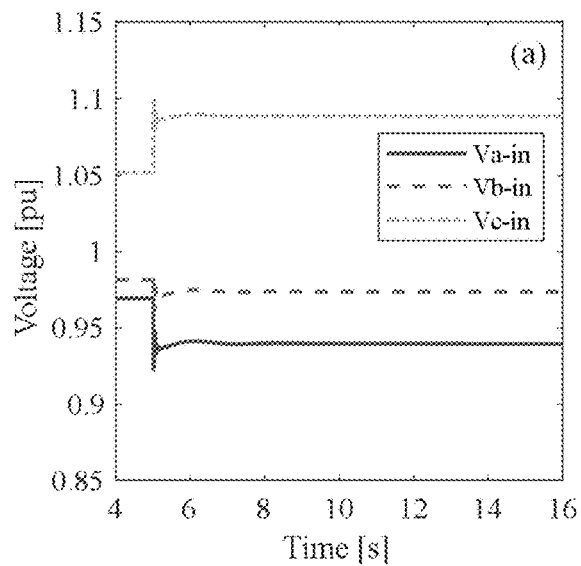
FIGS. 16A-16D are graphs of simulated performance of the grid in FIG. 15 without distributed frequency regulation.
Figure 16B:
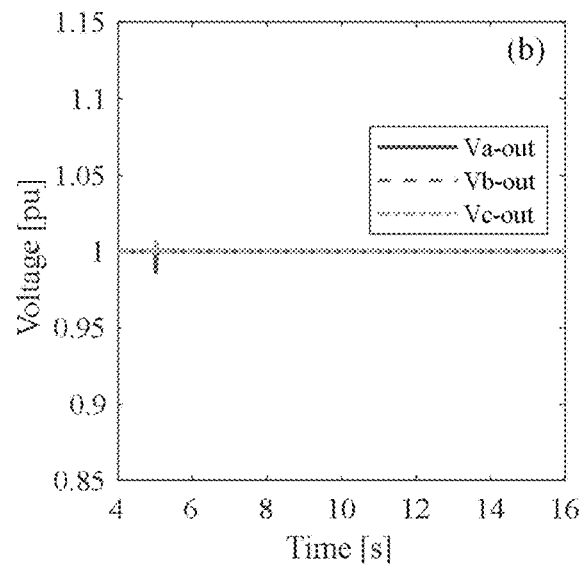
Figure 16C:
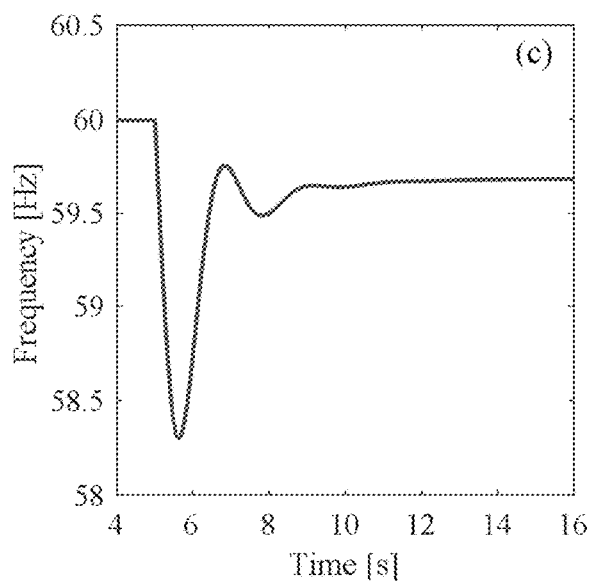
Figure 16D:
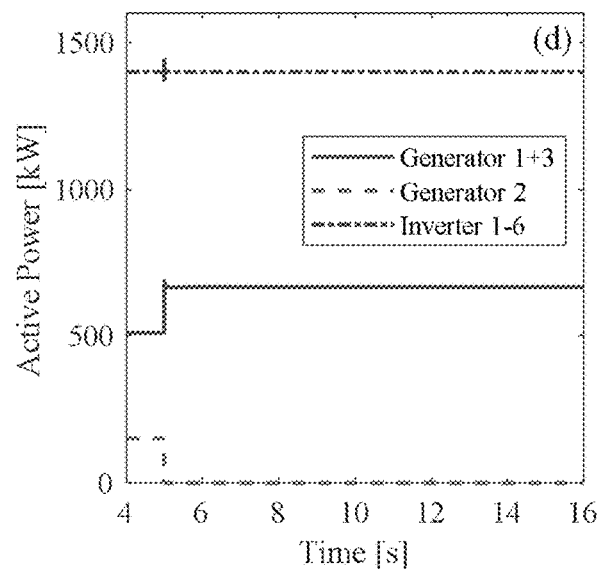

FIGS. 16A-16D show simulation results of Scenario 1 for the test feeder 1500. As shown in Error! Reference source not found. FIG. 16D, generator 1506b produces 150 kW of power before being tripped at 5 s. This tripping results in both voltage and frequency transients, as shown in FIGS. 16A and 16C. The detected line frequency drops to 58.31 Hz because of the low inertia of the network microgrid. Because the frequency controllers are disabled, the load-side voltages are maintained at 1 pu by the DVRs 1510a-1510f, regardless of the voltage transients at the primary side, as shown in FIGS. 16A and 16B. Although the voltage quality of the critical loads is maintained, the poor frequency response could result in under-frequency load shedding in a practical system and possibly even a system collapse.

Figure 17A:
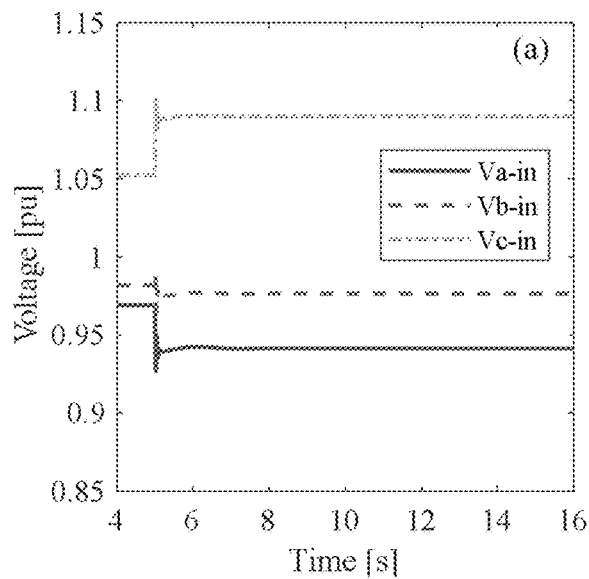
FIGS. 17A-17D are graphs of simulated performance of the grid in FIG. 15 with distributed frequency regulation.
Figure 17B:
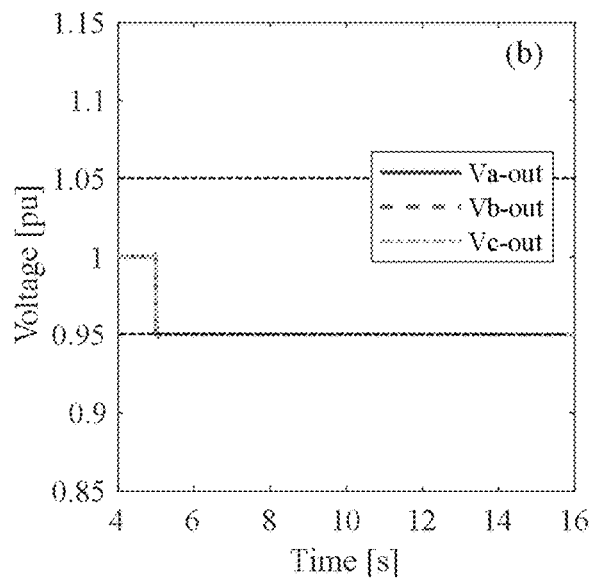
Figure 17C:
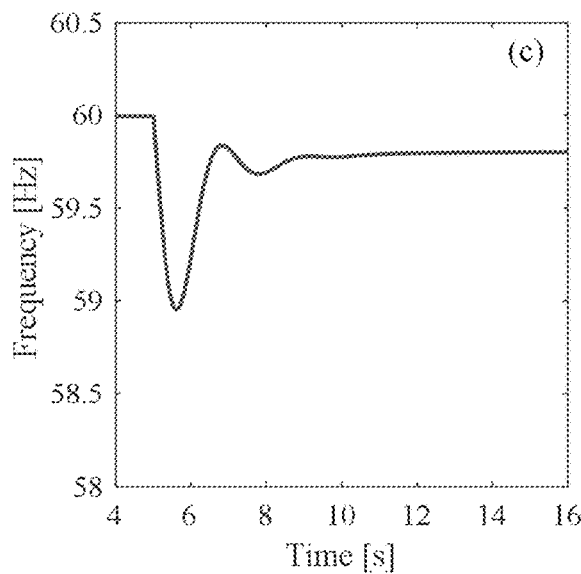
Figure 17D:
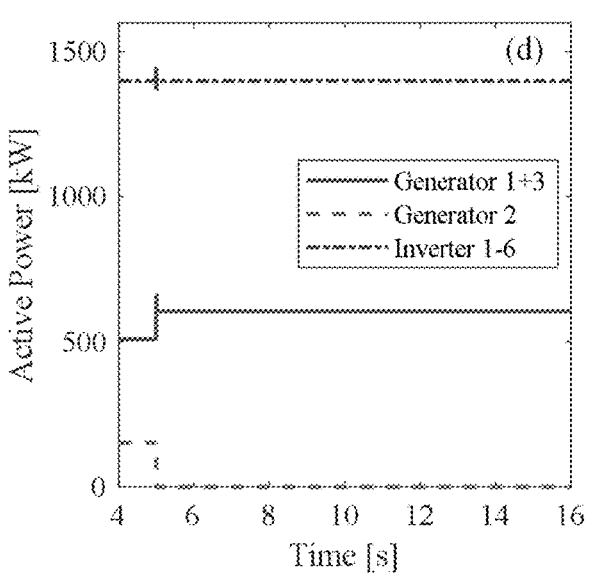

FIGS. 17A-17D show simulation results of Scenario 2 for the test feeder 1500. In this scenario, the frequency controllers of the DVRs 1510a-1510f are enabled, and the load voltages are allowed to vary in Range A. As shown in FIG. 17B, the DVR devices 1510a-1510f quickly reduce the load-side voltages to 0.95 pu after generator 1506b is tripped. The voltage reduction of critical loads results in a drop in total loads of about 2.9%, as reflected by FIG. 17D. The rapid reduction of total loads helps improve the frequency stability of the power grid. As shown in FIG. 17D, in contrast with simulations results with Scenario 1, the frequency nadir in Scenario 2 is relatively improved from 58.31 Hz to 58.96 Hz.

Figure 18A:
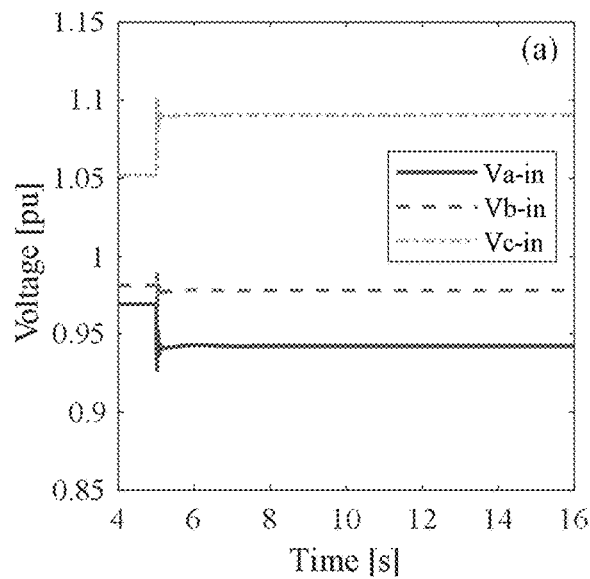
FIGS. 18A-18D are graphs of simulated performance of the grid in FIG. 15 according to another distributed frequency regulation scenario.
Figure 18B:
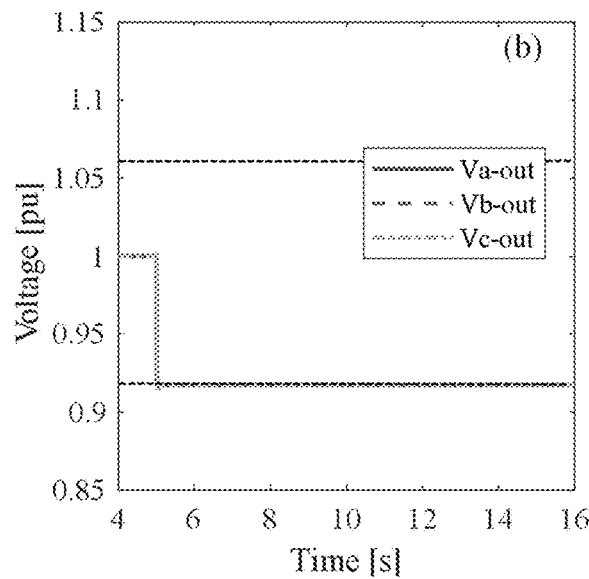
Figure 18C:
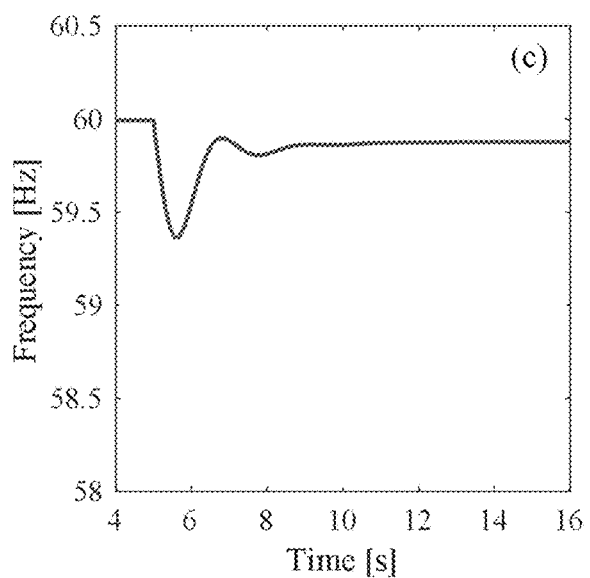
Figure 18D:
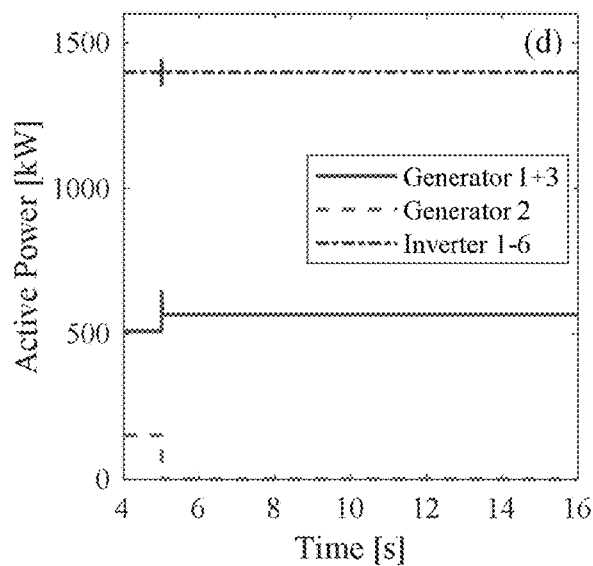

FIGS. 18A-18D show the simulation results of Scenario 3. As shown in FIG. 18B, the load-side voltages are rapidly reduced to 0.917 pu after the generator 1506b is tripped, which is the lower limit of Range B. The voltage reduction results in a drop in total loads of about 4.7%, as shown in FIG. 18D. Compared to Scenario 1, although the voltages of critical loads drop from 1 pu to 0.917 pu, a major improvement in frequency stability is observed as the frequency nadir is improved by more than 1 Hz, from 58.31 Hz to 59.36 Hz, as shown in FIGS. 16C and 18C. Although the load voltages deviate from the rated value during the frequency transients, the controllers in the DVRs 1510a-1510f can bring the load voltages back to nominal after the frequency of the grid reaches a steady state.

To improve the frequency stability of low-inertia networked microgrids, frequency control strategies can be employed by using distributed DVRs to selectively adjust voltage in response to frequency changes in addition to (or instead of) compensating for voltage sags in distribution systems. During frequency transients, disclosed frequency control strategies can allow distributed DVRs to quickly adjust voltage set points at the load side within an acceptable range, resulting in the rapid change of load power consumption and helping improve the frequency stability. Control examples can allow the use of existing devices in a distribution system to provide additional functions, thereby increasing flexibility and avoiding additional investments and costs.

IV. Additional Autonomous Examples

Figure 19:
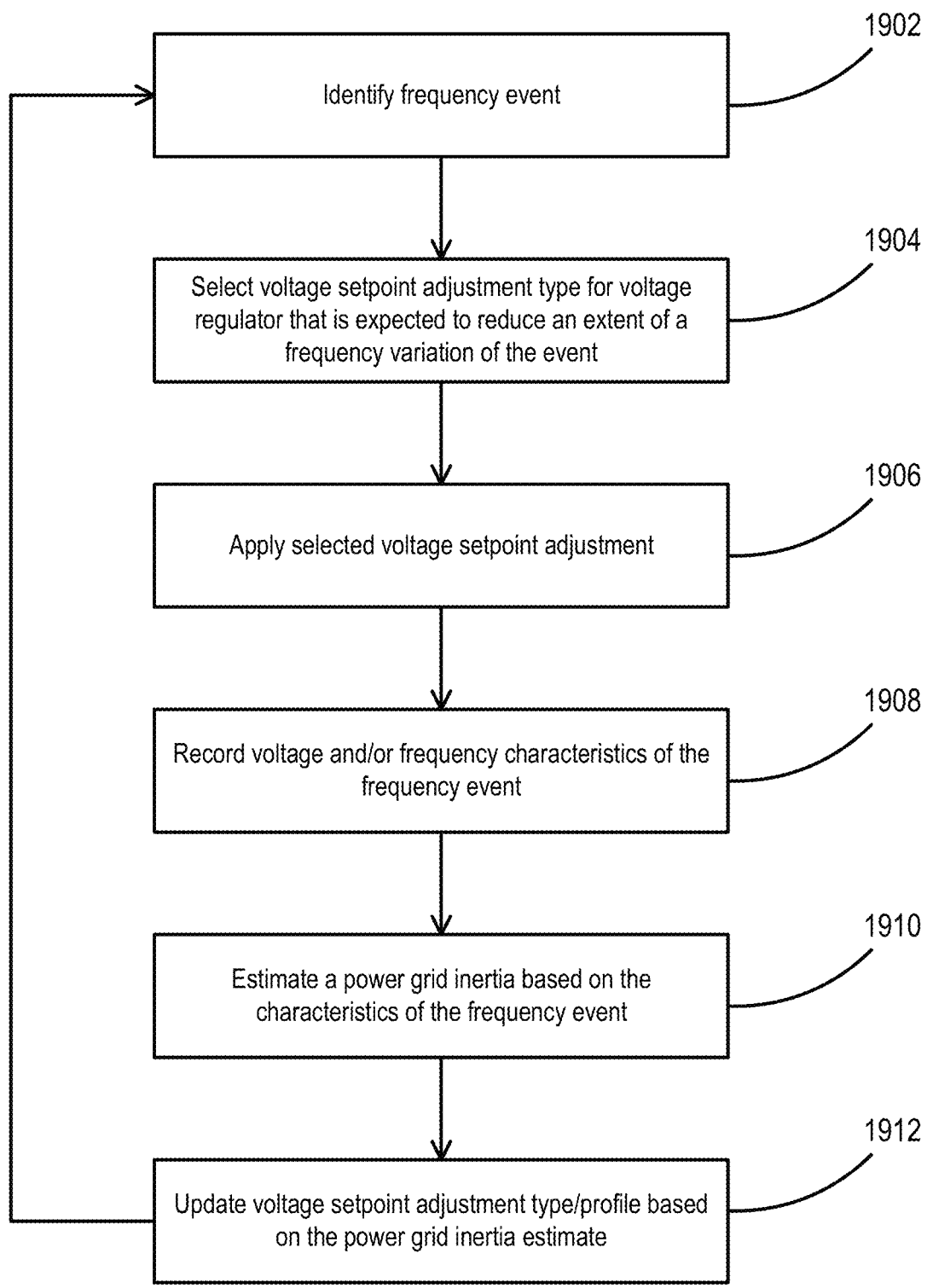
FIGS. 19-20 are flowcharts showing methods of distributed frequency regulation.

FIG. 19 shows another example control method 1900 that can be used to provide improved frequency stability by providing a degree of autonomous control with distributed voltage regulators, such as series and/or shunt compensators. At 1902, a frequency event is identified. For example, when the line frequency decreases below or increases above threshold, the change can trigger recognition of the event's significance to undertake related action by a voltage regulator, e.g., to cause an adjustment to a load side voltage in series compensators or a supply side voltage with shunt compensators. Frequency events can be detected various ways, such as by detecting the event locally at a voltage regulator or at another location and communicated to the controller of the voltage regulator through wire or wirelessly. Various types of frequency characteristics associated with a frequency event can be identified, such as passing of a single threshold, passing of multiple thresholds, how quickly the change of the frequency occurs, oscillation characteristics of the frequency change, frequency event shapes in the time and/or frequency domains, etc. Identification can include mapping events to different frequency event types based on the detected frequency event characteristics.

At 1904 a voltage setpoint adjustment type can be selected for the voltage regulator based on the expectation that the selected adjustment will reduce an extent of a frequency variation that occurs during the event. For example, absent the voltage setpoint adjustment, the frequency stability of the power grid can be expected to continue to vary substantially away from a nominal or preferred value (e.g., 60 Hz), typically with peaks or troughs exceeding acceptable frequency values for stable grid operation. Examples of setpoint adjustment types can include any previously described herein. For example, voltage setpoints can be tailored to a predetermined shape/profile and duration associated with a reduction in frequency variation and instability. Examples can include similar profiles shown in FIG. 9 having a drop, hold, and ramp, as well as other shapes, such as various combinations of steps, holds, and ramps, increases, decreases, and combinations thereof. Additional examples can be configured to control around a frequency target (such as the nominal value) directly using voltage setpoint as process variable. Voltage setpoint types can be selected based on the detected frequency characteristics. For example, where a faster, larger, or more deleterious frequency change associated with instability is detected, different setpoint adjustment types can be selected to produce a reduction in frequency variation. In some examples, the characteristics of the frequency event can be processed through a machine learning routine, such as a deep learning neural network, to match the frequency event with a voltage setpoint adjustment type. In some examples, the selection can be simplified to a singular response strategy. For example, in response to a frequency event identification (such as passing a threshold), a uniform voltage setpoint profile can be used. After selection, at 1906, the selected voltage setpoint adjustment can be applied to the voltage regulator to produce the reduction in frequency variation in response to the frequency event so as to improve the stability of the power distribution grid. In many cases, the process of identifying the frequency event and selecting/applying an associated setpoint adjustment can be sufficient to provide an autonomous reduction in frequency instability for a power distribution grid. At 1908, characteristics of the frequency event can be recorded for various uses, such as selection among various setpoint adjustment types.

In further examples, at 1910, a power grid inertia value can be estimated based on the characteristics of the frequency event, such as line voltage (including line frequency) values and changes in values over time. For example, in the absence of a frequency regulation attempt by the controller of the voltage regulator, or after a controlled response according to a selected setpoint adjustment, the controller or another source can compare the event characteristics to one or more other event characteristics and determine an inertia estimate. At 1912, from the inertia estimate, updated voltage setpoints can be made. In some examples, an inertia estimate can be determined based on a closest match to a table of values. In further examples, inertia estimates can be determined by processing the event characteristics through a neural network. The neural network can then be updated using the current frequency event, and together with the previous frequency events a training set for the neural network can be formed so that setpoint adjustments for the frequency stability controller can be adapted to the change in the inertia of the power distribution grid as it evolves over time. In representative examples, voltage setpoint adjustments can be selected based on grid inertia values. In some examples, different voltage setpoint adjustments can be selected in response to various types of identified frequency events using a current or updated inertia value and selecting from one or more voltage setpoint adjustments associated with the inertia value.

Figure 20:
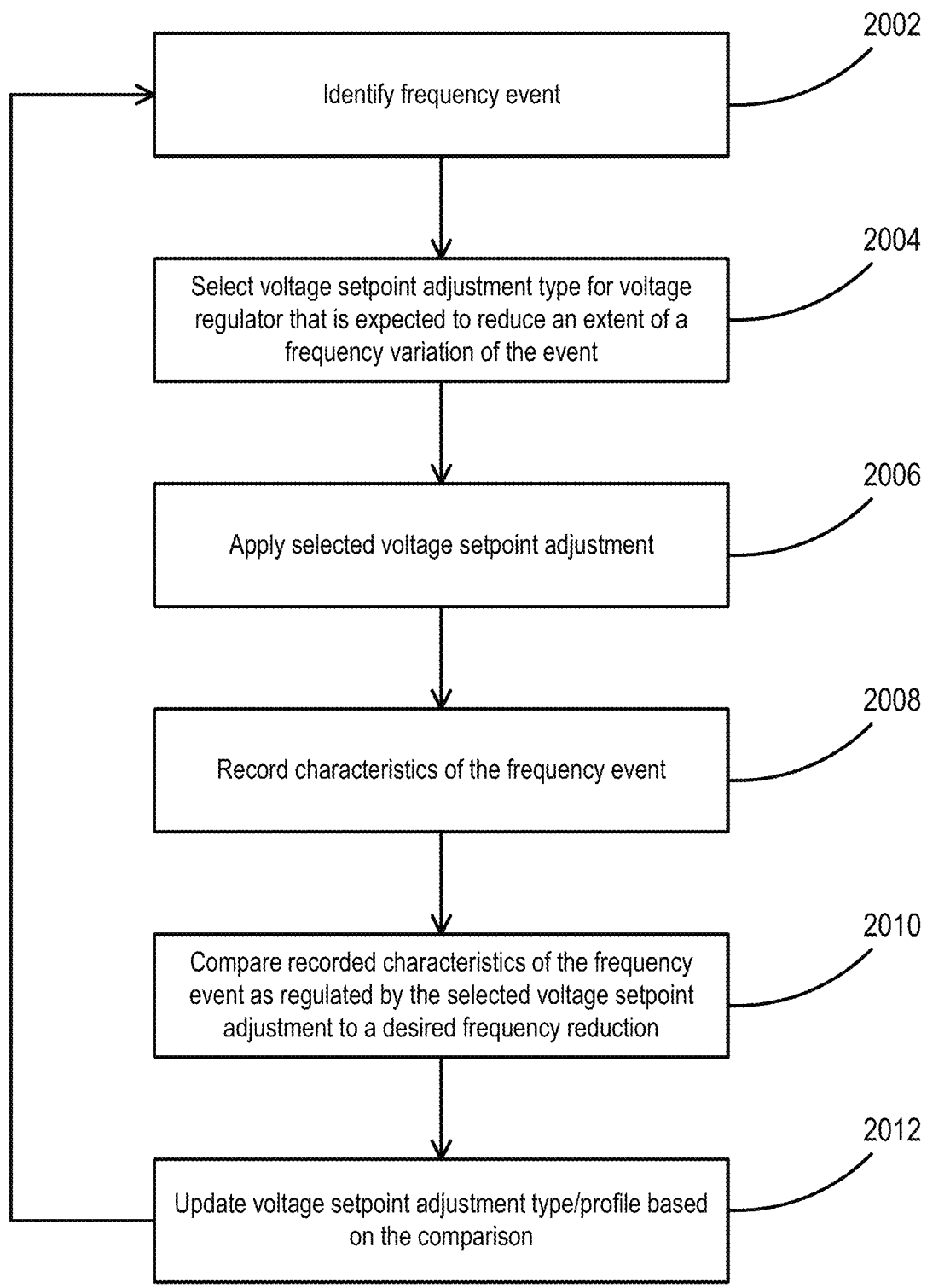

FIG. 20 shows additional examples where voltage setpoints can be adjusted over time by comparing the effectiveness of a frequency regulation response to a frequency event, e.g., without estimating an inertia, so that performance of the system can stay tuned to existing system conditions as conditions change over time. Similar frequency event identification, voltage setpoint adjustment selection, and application can be performed at 2002, 2004, 2006, respectively. In some examples, voltage regulator controllers can use a machine learning routine, such as one or more neural networks to update voltage setpoints after frequency events. In an example, after a voltage adjustment profile is applied to a frequency event and produces (through its contribution with other voltage regulators) a reduction in line frequency variation, the reduction produced can be compared, at 2010, to a desired reduction in the frequency variation. For example, a comparison error can be back-propagated through the neural network to update activations of one or more network layers of the neural network to produce changes to the voltage setpoint adjustment applied to the recent frequency event to produce an updated voltage setpoint adjustment, at 2012, that would instead be projected to produce, for a future similar frequency event, the desired reduction in the line frequency variation or a reduction closer to the desired reduction in line frequency variation. In some examples, comparisons and updates can be performed without using a specific machine learning routine, e.g., by increasing or decreasing a voltage setpoint adjustment characteristic (e.g., voltage drop, hold duration, ramp rate, etc.) incrementally based on the comparison error.

The distributed voltage regulators can continue to monitor for future frequency events so that they may be identified at 1902, 2002 to continue to provide frequency stability, and optionally continue to adapt voltage setpoints as the inertia or other systems changes affect the power grid over time. Some examples can include inter-device communication, e.g., aggregating gathered frequency event data and applied voltage setpoints, and sharing or coordinating analysis of the aggregate data to produce inertia estimates or other voltage setpoint adjustments.

V. Exemplary Computing Environment

Figure 21:
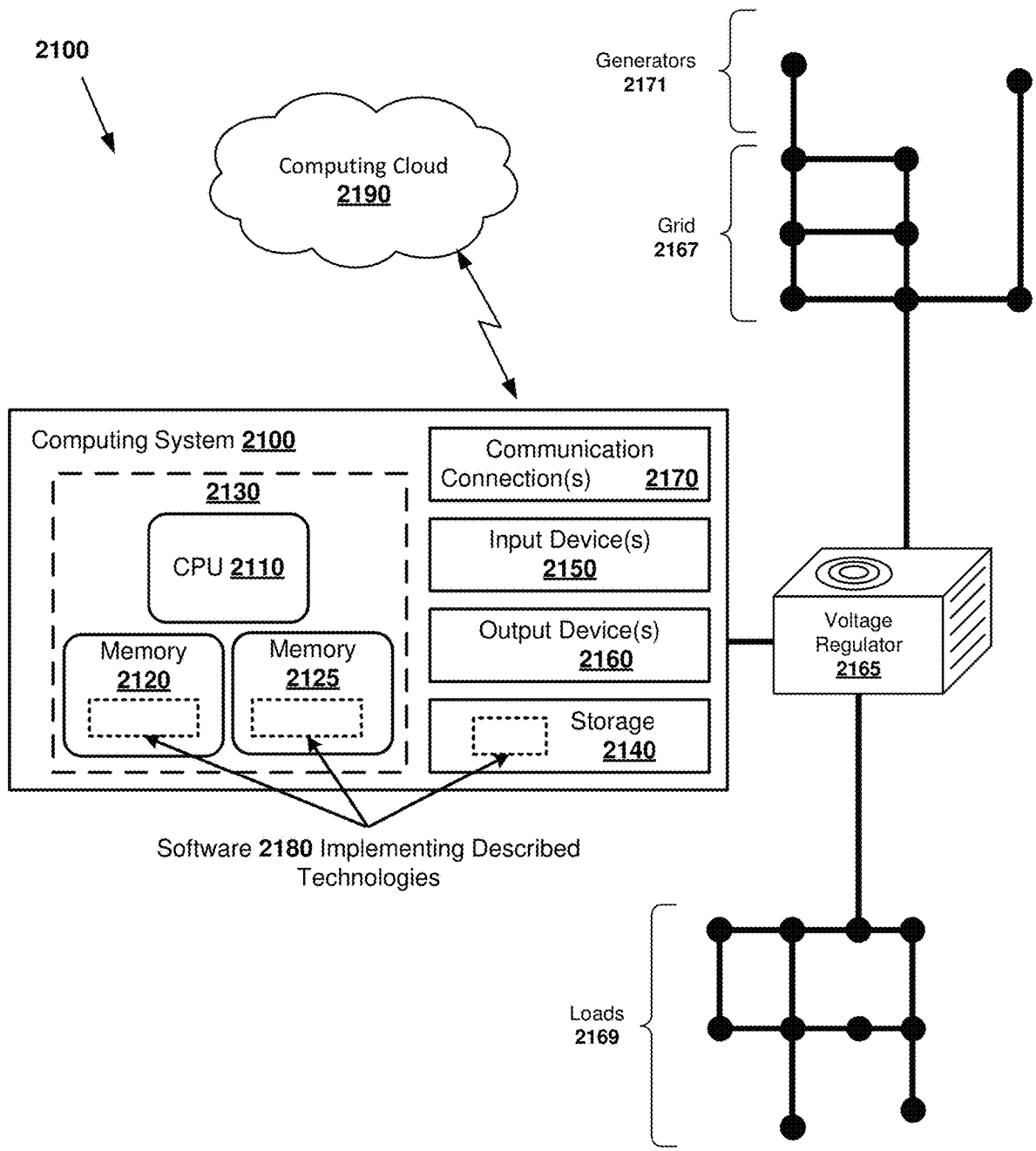
FIG. 21 is a schematic of a computing environment that can be used to carry out various disclosed methods.

FIG. 21 illustrates a generalized example of a suitable computing environment 2100 in which described embodiments, techniques, and technologies, including determining the existence of frequency events associated with grid instabilities, regulating voltages at a grid edge, and reducing the extent of a frequency variation that occurs during the frequency events can be implemented. For example, the computing environment 2100 can be used to implement any of the controllers for voltage regulation, as described herein.

The computing environment 2100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 21, the computing environment 2100 includes at least one central processing unit 2110 and memory 2120. In FIG. 21, this most basic configuration 2130 is included within a dashed line. The central processing unit 2110 executes computer-executable instructions and may be a real or a virtual processor. The central processing unit 2110 can be a general-purpose microprocessor, a microcontroller, or other suitable processor. In a multi-processing system, multiple processing units execute computer-executable instructions to increase processing power and as such, multiple processors can be running simultaneously. The memory 2120 may be volatile memory (e.g., registers, cache, RAM), non-volatile memory (e.g., ROM, EEPROM, flash memory, etc.), or some combination of the two. The memory 2120 stores software 2180, parameters, and other data that can, for example, implement the technologies described herein. A computing environment may have additional features. For example, the computing environment 2100 includes storage 2140, one or more input devices 2150, one or more output devices 2160, and one or more communication connections 2170. The computing environment 2100 can be coupled to a voltage regulator 2165 (such as a series compensator, shunt compensator, dynamic voltage restorer, etc.) and/or electrical grid 2167 (e.g., a microgrid, a set of networked microgrids, etc.). The voltage regulator 2165 can be situated at an edge of the electrical grid 2167 to provide dynamic voltage regulation, such as by maintaining a voltage for loads 2169, and dynamic frequency instability reduction for the grid 2167 when frequency anomalies, transients, or other events occur, such as upon failure of a generator 2171. An interconnection mechanism (not shown) such as a bus, a controller, or a network, interconnects the components of the computing environment 2100. Typically, operating system software (not shown) provides an operating environment for other software executing in the computing environment 2100, and coordinates activities of the components of the computing environment 2100.

The storage 2140 may be removable or non-removable, and includes magnetic disks, magnetic tapes or cassettes, CD-ROMs, CD-RWs, DVDs, or any other medium which can be used to store information and that can be accessed within the computing environment 2100. The storage 2140 stores instructions for the software 2180, which can be used to implement technologies described herein.

The input device(s) 2150 may be a touch input device, such as a keyboard, keypad, mouse, touch screen display, pen, or trackball, a voice input device, a scanning device, or another device, that provides input to the computing environment 2100. For audio, the input device(s) 2150 may be a sound card or similar device that accepts audio input in analog or digital form, or a CD-ROM reader that provides audio samples to the computing environment 2100. The input device(s) 2150 can also include sensors and other suitable transducers for generating data about the voltage regulator 2165 and/or grid 2167, for example, voltage measurements, frequency measurements, current measurements, temperature, and other suitable sensor data. The output device(s) 2160 may be a display, printer, speaker, CD-writer, or another device that provides output from the computing environment 2100. The output device(s) 2160 can also include interface circuitry for sending commands and signals to the voltage regulator 2165, for example, to adjust voltage setpoints in response to a frequency event associated with an instability of the electrical grid 2167.

The communication connection(s) 2170 can enable communication over a communication medium (e.g., a connecting network) to another computing entity. The communication medium conveys information such as computer-executable instructions, compressed graphics information, video, or other data in an adjusted data signal. The communication connection(s) 2170 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controllers. Both wired and wireless connections can be implemented using a network adapter. In a virtual host environment, the communication(s) connections can be a virtualized network connection provided by the virtual host. In some examples, the communication connection(s) 2170 are used to supplement, or in lieu of, the input device(s) 2150 and/or output device(s) 2160 in order to communicate with the voltage regulators, sensors, other controllers, or smart grid components.

Some embodiments of the disclosed methods can be performed using computer-executable instructions implementing all or a portion of the disclosed technology in a computing cloud 2190. For example, immediate response functions, such as generating frequency regulation signals or voltage setpoint adjustment signals can be performed in the computing environment while calculation of parameters for programming the controller (such as machine learning calculations) can be performed on servers located in the computing cloud 2190.

Computer-readable media are any available media that can be accessed within a computing environment 2100. By way of example, and not limitation, with the computing environment 2100, computer-readable media include memory 2120 and/or storage 2140. As should be readily understood, the term computer-readable storage media includes the media for data storage such as memory 2120 and storage 2140, and not transmission media such as adjusted data signals.

VI. General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "adjust," "deploy," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including microcontrollers or servers that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")), programmable logic controller ("PLC"), complex programmable logic device ("CPLD"), etc. The integrated circuit or specialized computing hardware can be embedded in or directly coupled to electrical voltage regulators situated at a grid edge. For example, the integrated circuit can be embedded in or otherwise coupled to a voltage regulator (e.g., a series compensator, shunt compensator, dynamic voltage restorer, etc.). As will be readily understood to one of ordinary skill in the relevant art having the benefit of the present disclosure, a single controller can be used to control one, two, or more voltage regulators. Similarly, multiple voltage regulators each having their own associated controller can be deployed in a single system.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
in response to a line frequency variation of a power grid, adjusting a voltage setpoint of a voltage regulator coupled to the power grid at a grid edge to maintain a voltage at the grid edge, wherein the adjusting the regulated voltage setpoint is configured to reduce the line frequency variation to stabilize the line frequency of the power grid.

2. The method of claim 1, further comprising adjusting a voltage setpoint of one or more other voltage regulators in response to the same line frequency variation to reduce the line frequency variation to stabilize the line frequency of the power grid through the aggregate effect of adjusting the voltage setpoints of the voltage regulators.

3. The method of claim 1, further comprising identifying the frequency variation from a line frequency signal.

4. The method of claim 3, further comprising detecting the line frequency to produce the line frequency signal.

5. The method of claim 1, wherein the adjusting the voltage setpoint in response to the line frequency variation comprises adjusting the voltage setpoint in response to the line frequency variation passing one or more predetermined line frequency thresholds.

6. The method of claim 1, wherein the adjusting the voltage setpoint in response to the line frequency variation comprises adjusting the voltage setpoint according to a predetermined variation in the voltage setpoint over time.

7. The method of claim 1, wherein the adjusting the voltage setpoint in response to the line frequency variation comprises controlling to a line frequency setpoint through adjusting of the voltage setpoint as a process variable.

8. The method of claim 1, further comprising estimating a grid inertia based on characteristics of the frequency variation and updating based on the estimate a voltage setpoint adjustment to be used in response to a future frequency variation.

9. The method of claim 1, further comprising comparing characteristics of the frequency variation to a desired reduction in frequency variation and updating based on the comparison a voltage setpoint adjustment to be used in response to a future frequency variation.

10. The method of claim 1, wherein the voltage regulator comprises a series compensator configured to maintain voltage at a secondary side of the voltage regulator.

11. The method of claim 10, wherein the series compensator comprises a dynamic voltage restorer.

12. The method of claim 1, wherein the voltage regulator comprises a shunt compensator configured to maintain a grid voltage at a primary side of the voltage regulator.

13. The method of claim 1, wherein the adjusting the voltage setpoint in response to the line frequency variation is performed independent of an external command communication.

14. An apparatus, comprising:
a voltage regulator configured to couple to a power grid at a grid edge and to maintain a voltage at the grid edge, wherein the voltage regulator is further configured to adjust a voltage setpoint of a voltage regulator in response to a line frequency variation of the power grid to reduce the line frequency variation and stabilize the line frequency of the power grid.

15. The apparatus of claim 14, further comprising one or more other voltage regulators configured to adjust respective voltage setpoints in response to the same line frequency variation to reduce the line frequency variation and stabilize the line frequency of the power grid through the aggregate effect of adjusting the voltage setpoints of the voltage regulators.

16. The apparatus of claim 14, wherein the voltage regulator is configured to identify the frequency variation from a line frequency signal.

17. The apparatus of claim 16, wherein the voltage regulator comprises a line frequency detector configured to detect a frequency of a power grid voltage coupled to the voltage regulator and to produce the line frequency signal corresponding to the detected frequency.

18. The apparatus of claim 14, wherein the voltage regulator is configured to adjust the voltage setpoint in response to the line frequency variation passing one or more predetermined line frequency thresholds.

19. The apparatus of claim 14, wherein the voltage regulator is configured to adjust the voltage setpoint in response to the line frequency variation by adjusting the voltage setpoint according to a predetermined variation in the voltage setpoint over time.

20. The apparatus of claim 14, wherein the voltage regulator is configured to adjust the voltage setpoint in response to the line frequency variation by controlling to a line frequency setpoint through adjustment of the voltage setpoint as a process variable.

21. The apparatus of claim 14, wherein the voltage regulator is configured to estimate a grid inertia based on characteristics of the frequency variation and updating based on the estimate a voltage setpoint adjustment to be used in response to a future frequency variation.

22. The apparatus of claim 14, wherein the voltage regulator is configured to compare characteristics of the frequency variation to a desired reduction in frequency variation and updating based on the comparison a voltage setpoint adjustment to be used in response to a future frequency variation.

23. The apparatus of claim 14, wherein the voltage regulator comprises a series compensator configured to maintain voltage at a secondary side of the voltage regulator.

24. The apparatus of claim 23, wherein the series compensator comprises a dynamic voltage restorer.

25. The apparatus of claim 14, wherein the voltage regulator comprises a shunt compensator configured to maintain a grid voltage at a primary side of the voltage regulator.

26. The apparatus of claim 14, wherein the voltage regulator is configured to adjust the voltage setpoint in response to the line frequency variation independent of an external command communication.

27. The apparatus of claim 14, wherein the voltage regulator comprises:
a controller configured to generate a voltage control signal responsive to a variation in grid voltage and to generate a voltage setpoint adjustment signal in response to the frequency variation.

28. A power electronics device, comprising the voltage regulator of claim 14.

29. A method of manufacturing an apparatus, the method comprising:
providing a controller for a voltage regulator at a power grid edge, the controller comprising a computer-readable storage device or memory storing computer executable instructions that when executed by a processor, cause the controller to perform a method of voltage and frequency regulation at the power grid edge, the method comprising:
receiving an indication of a line frequency variation in the power grid, and
adjusting a voltage setpoint of the voltage regulator to reduce the line frequency variation and stabilize the line frequency of the power grid.

30. The method of claim 29, further comprising programming the controller by selecting one or more frequency variation thresholds for triggering the adjusting of the voltage setpoint.

31. The method of claim 29, further comprising programming the controller to communicate with voltage regulators to coordinate simultaneous frequency regulation with shunt-based compensators.

32. The method of claim 29, further comprising programming the controller to autonomously estimate a grid inertia based on characteristics of the frequency variation and autonomously update based on the estimate a voltage setpoint adjustment to be used in response to a future frequency variation.

33. The method of claim 29, further comprising programming the controller to autonomously compare characteristics of the frequency variation to a desired reduction in frequency variation and autonomously update based on the comparison a voltage setpoint adjustment to be used in response to a future frequency variation.

* * * * *